US010925383B2

(12) United States Patent
Murakami

(10) Patent No.: US 10,925,383 B2
(45) Date of Patent: Feb. 23, 2021

(54) CLIPPING COSMETIC TUBE HOLDER

(71) Applicant: Hanna Skye Murakami, Palatine, IL (US)

(72) Inventor: Hanna Skye Murakami, Palatine, IL (US)

(*) Notice: Subject to any disclaimer, the term of this patent is extended or adjusted under 35 U.S.C. 154(b) by 0 days.

(21) Appl. No.: 15/681,103

(22) Filed: Aug. 18, 2017

(65) Prior Publication Data

US 2019/0053611 A1   Feb. 21, 2019

(51) Int. Cl.
*A45F 5/02* (2006.01)
*A45D 40/00* (2006.01)
*F16B 2/22* (2006.01)
*F16B 2/24* (2006.01)

(52) U.S. Cl.
CPC ............ *A45F 5/02* (2013.01); *A45D 40/00* (2013.01); *A45F 5/021* (2013.01); *F16B 2/22* (2013.01); *A45D 2040/0012* (2013.01); *F16B 2/245* (2013.01)

(58) Field of Classification Search
CPC ............ A45F 5/02; A45F 2200/0566; A45F 2200/021; A45D 2040/0012; A45D 40/00; F16B 2/22; F16B 2/245
USPC ......... 224/666, 247; 206/85–89; 248/229.26, 248/229.15
See application file for complete search history.

(56) References Cited

U.S. PATENT DOCUMENTS

| | | | |
|---|---|---|---|
| D244,907 S * | 7/1977 | Link | D8/395 |
| 4,214,688 A * | 7/1980 | Griffin, Jr. | A45F 5/00 224/197 |
| 5,351,866 A * | 10/1994 | Foss | A45F 5/00 224/148.4 |
| 5,379,928 A | 1/1995 | Mikkelsen | |
| 5,414,906 A | 5/1995 | Kren | |
| 5,836,055 A | 11/1998 | Cooper | |
| 6,279,794 B1 * | 8/2001 | Miyazaki | A45F 3/16 224/148.4 |
| 6,321,958 B1 | 11/2001 | Erdmann | |
| 6,382,481 B1 | 5/2002 | McIlmoil | |
| D471,316 S * | 3/2003 | Budde | D27/161 |
| 7,568,250 B2 * | 8/2009 | Menard-Flanagan | B25H 3/006 24/3.12 |
| 8,720,756 B2 * | 5/2014 | Parsons | A45F 5/02 224/269 |
| 8,777,170 B2 * | 7/2014 | Gilbert | A63H 3/50 224/666 |

(Continued)

*Primary Examiner* — Nathan J Newhouse
*Assistant Examiner* — Matthew T Theis
(74) *Attorney, Agent, or Firm* — Garlick & Markison; Bruce E. Stuckman

(57) ABSTRACT

A clipping cosmetic tube holder includes a clip element that includes a clip spine, and a clip toe that protrudes from an end of the clip spine. The clipping cosmetic tube holder further includes a clip connector element that includes a back portion, a pair of arced ribs, and a bridge that connects the back portion to the clip element. A longitudinal axis of the back portion is offset the clip spine, forming a slot between the clip spine and the back portion that is configured to secure a portion of a garment within the slot and along the clip spine. The pair of arced ribs are connected to the back portion and are bilaterally symmetrical about the longitudinal axis of the back portion, configured to secure a cosmetic tube to the back portion by wrapping around a longitudinal section of a cylindrical surface of the cosmetic tube.

17 Claims, 33 Drawing Sheets

(56) References Cited

U.S. PATENT DOCUMENTS

| | | | |
|---|---|---|---|
| 8,839,546 B2* | 9/2014 | Taylor | F41C 33/007 42/107 |
| 2004/0089759 A1 | 5/2004 | Genuise | |
| 2015/0069197 A1* | 3/2015 | Mitchell | B60R 11/00 248/221.11 |

* cited by examiner

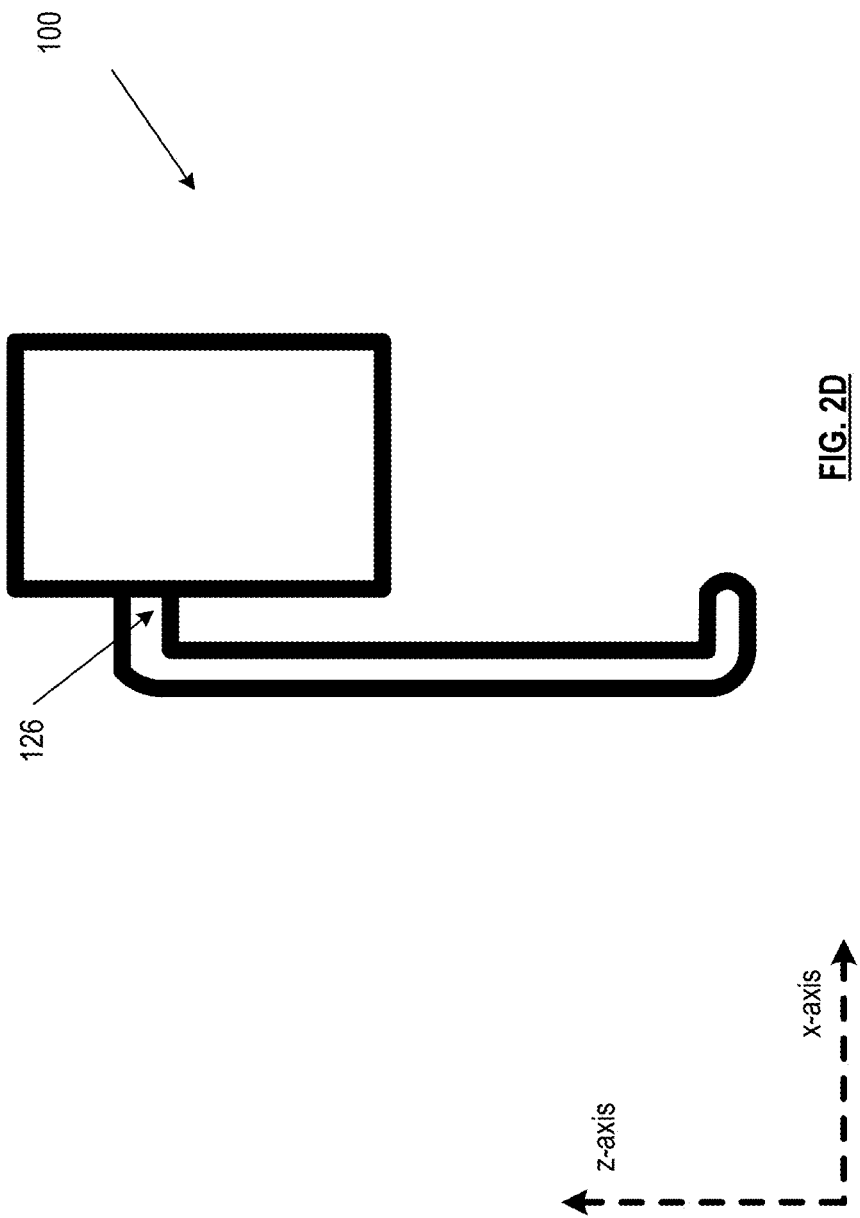

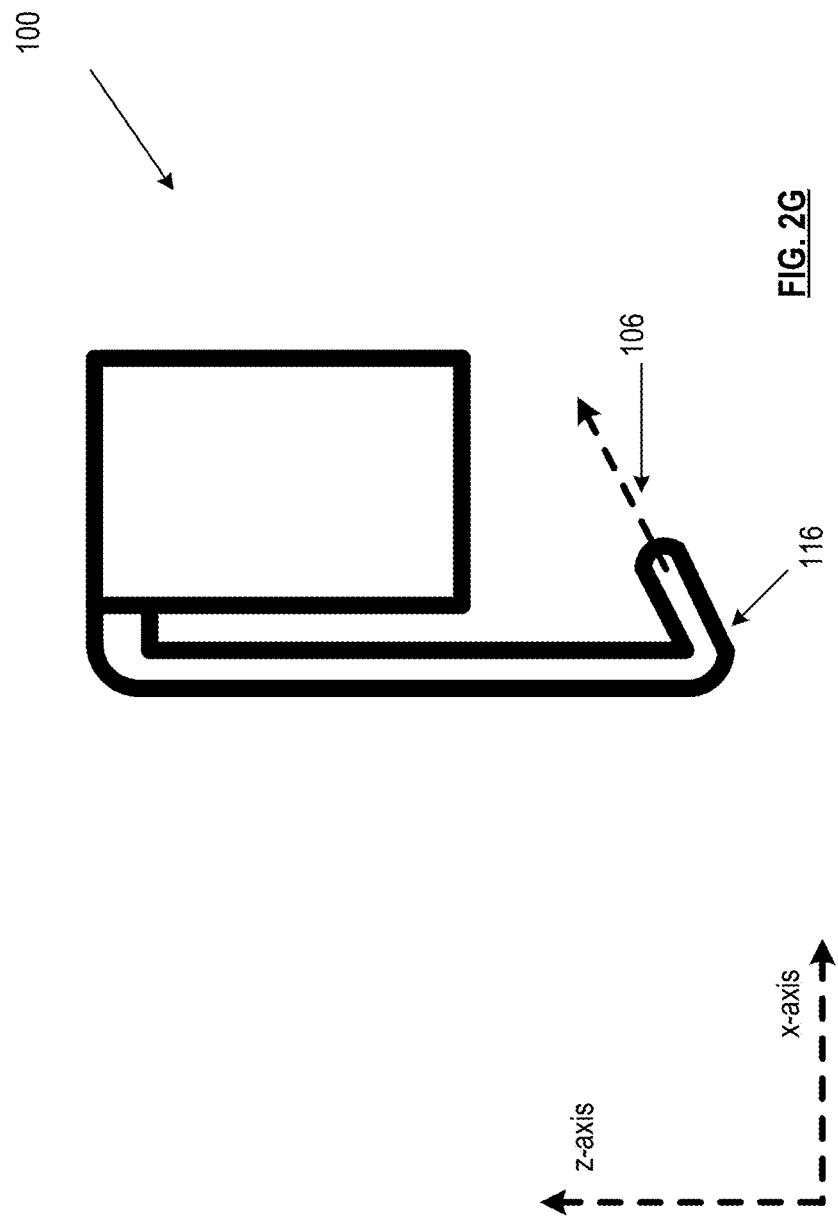

FIG. 2H
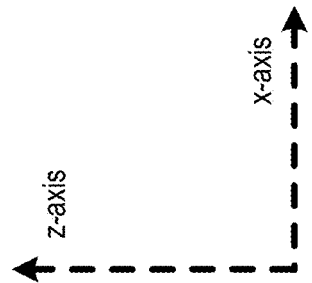

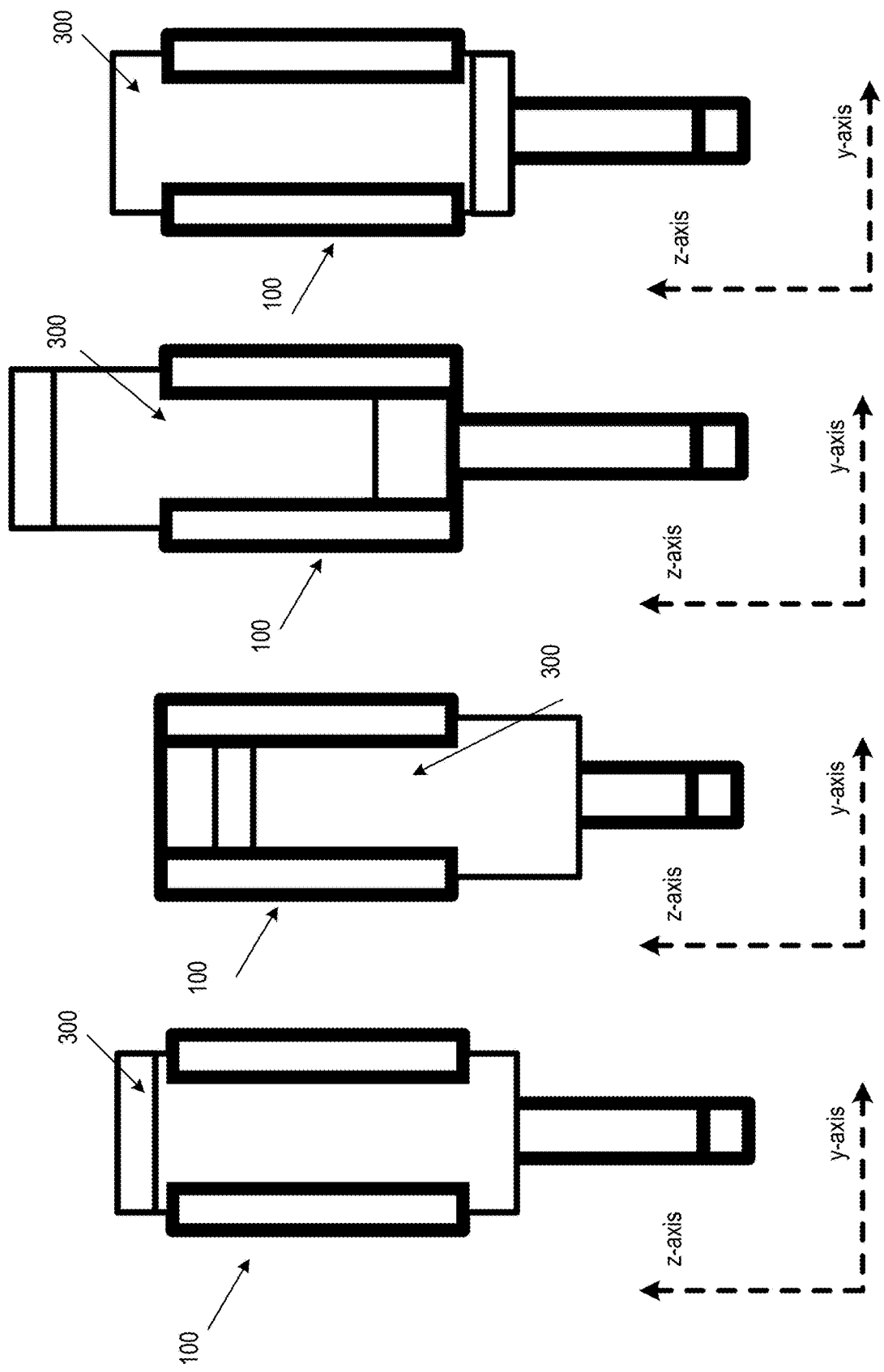

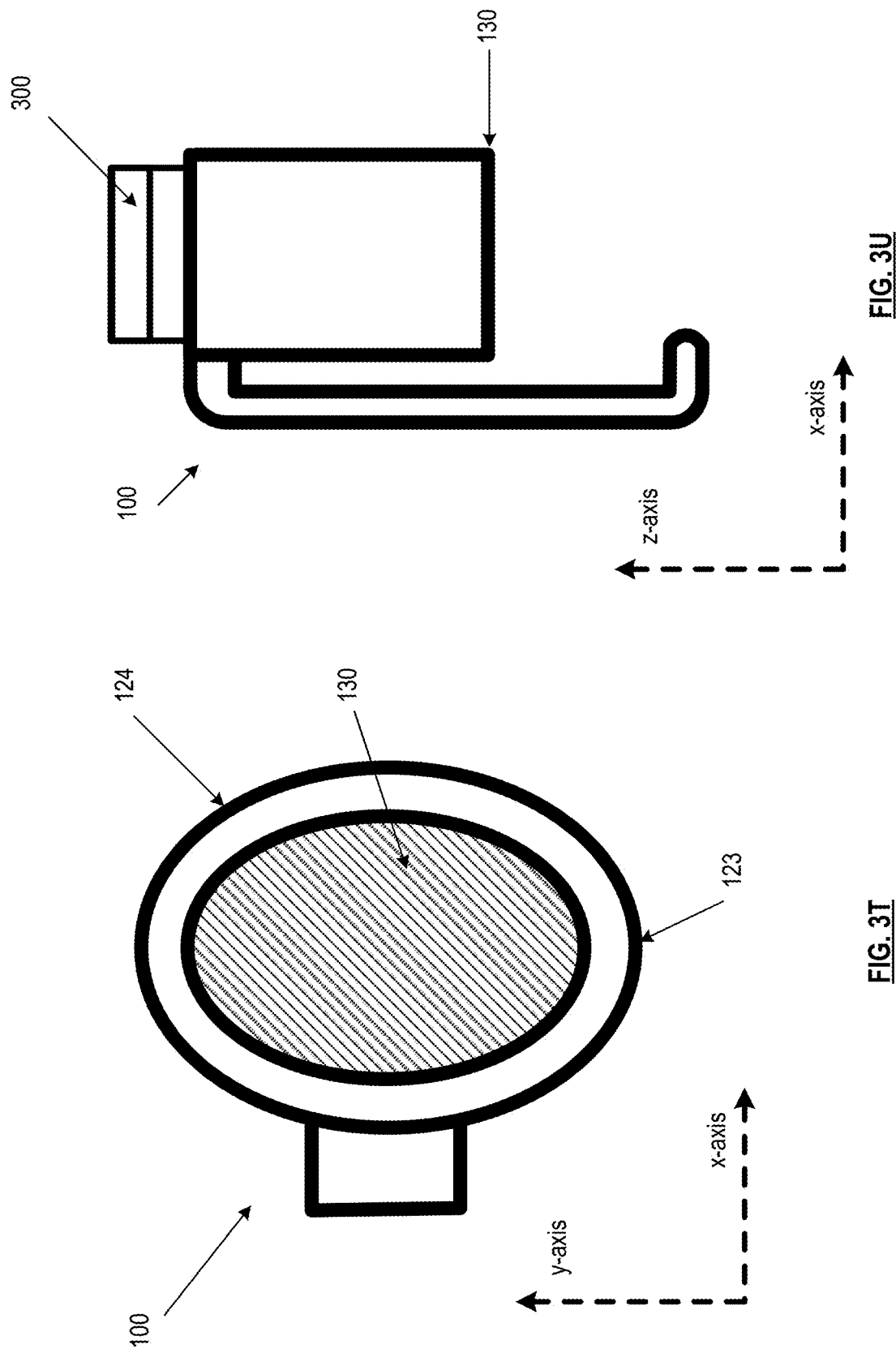

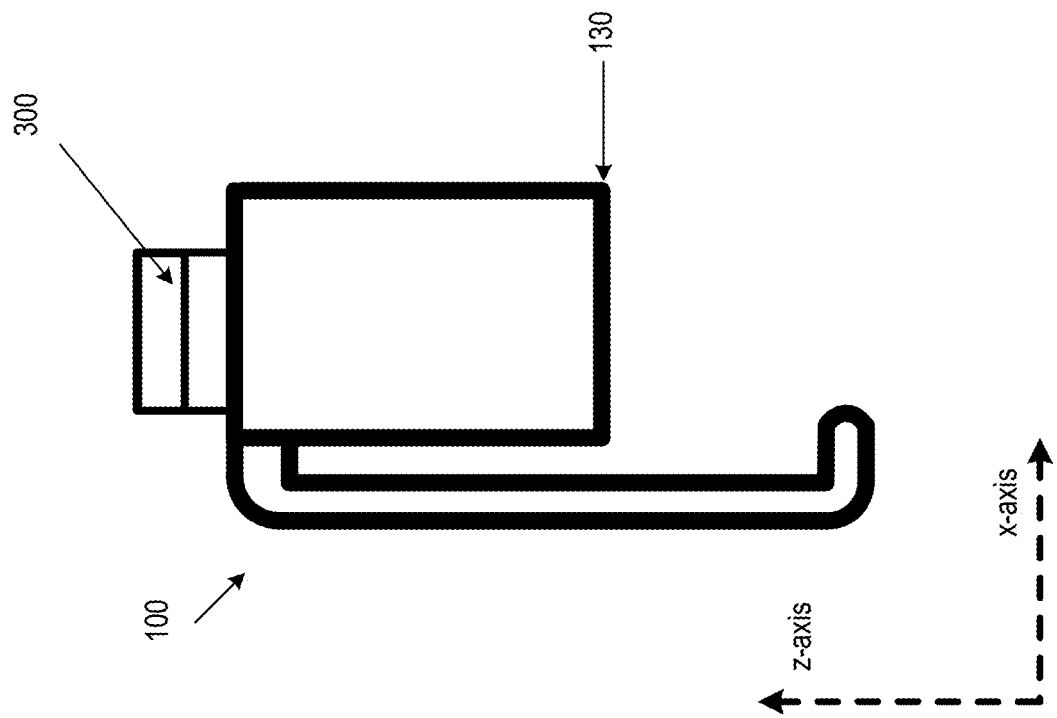
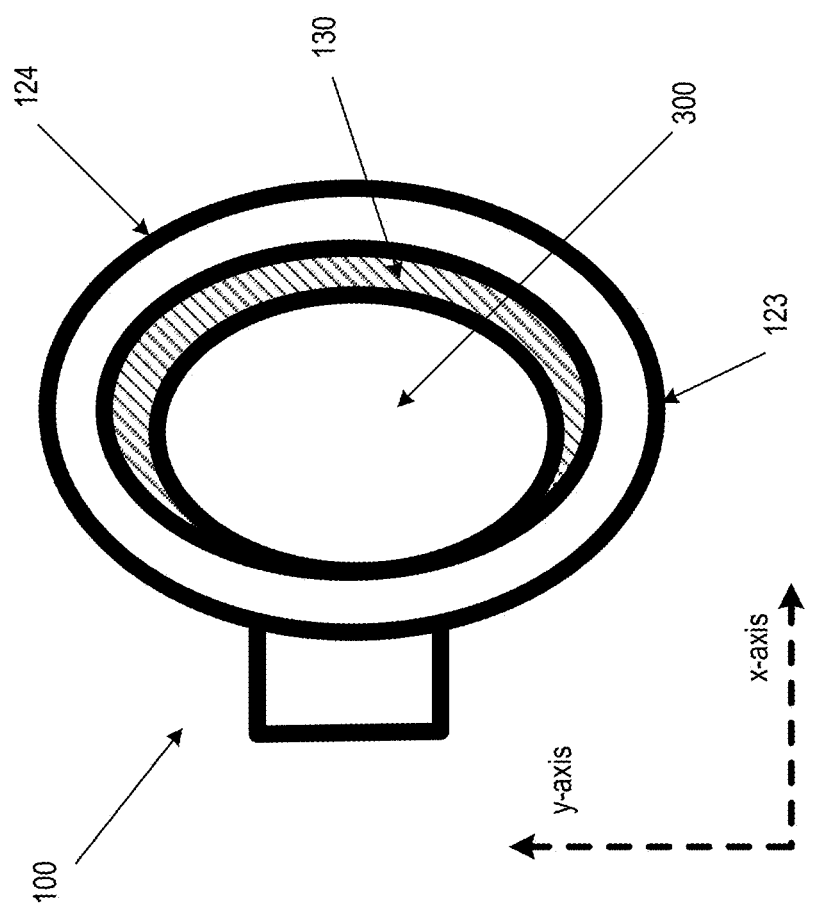
FIG. 3W
FIG. 3V

CLIPPING COSMETIC TUBE HOLDER

CROSS-REFERENCE TO RELATED APPLICATIONS

None

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to apparatuses for holding cosmetic accessories and apparatuses configured to secure to garments.

BRIEF SUMMARY OF DRAWINGS

FIGS. 2D-2K are two-dimensional graphical illustrations of example embodiments of the present invention;

DETAILED DESCRIPTION OF THE INVENTION

Figure 1:
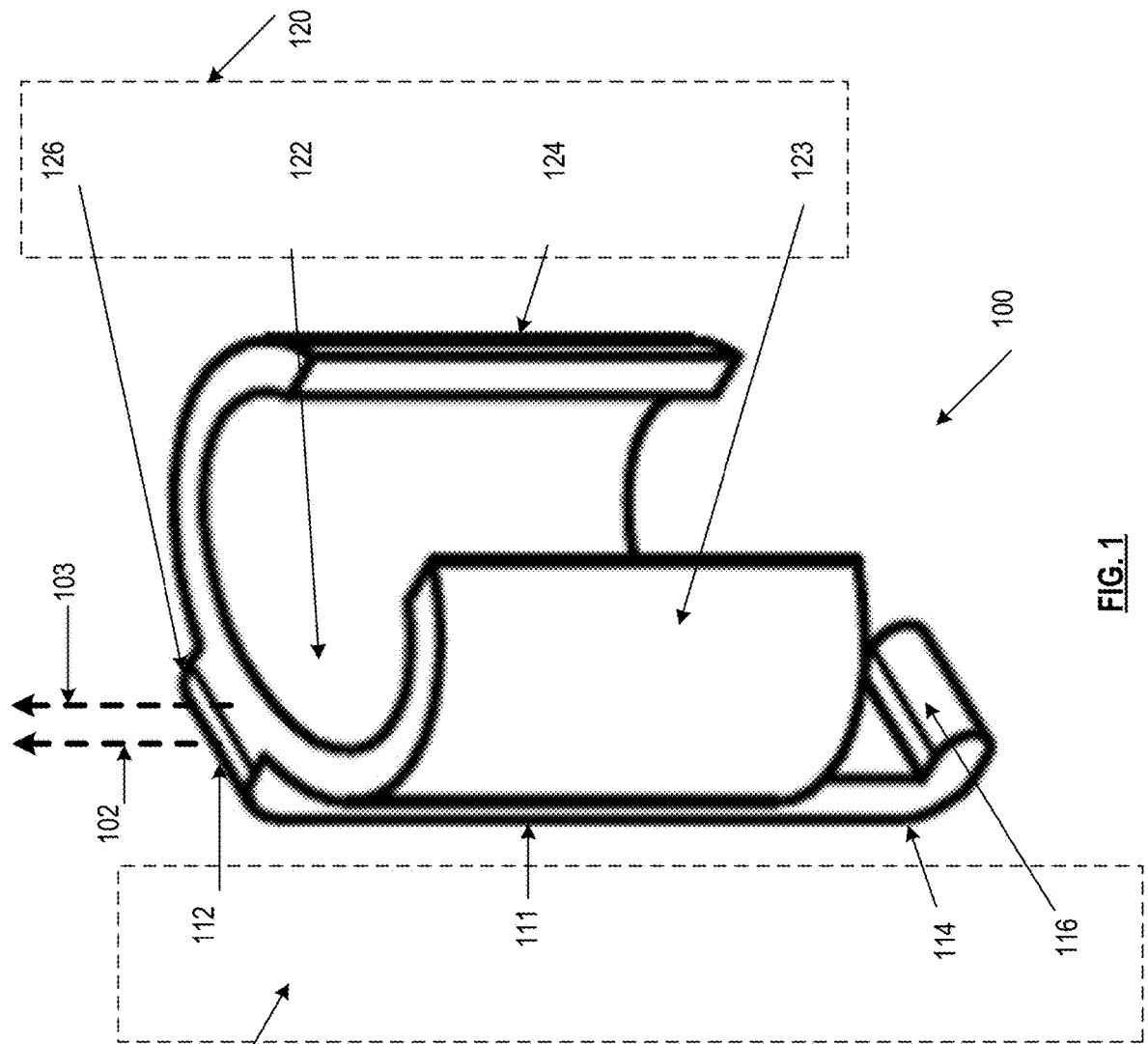
FIG. 1 is a three-dimensional graphical illustration of an embodiment of the present invention.
Figure 1:
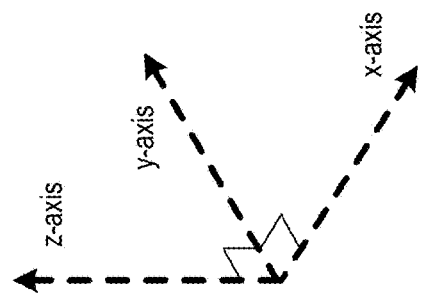

FIG. 1 is a three-dimensional graphical illustration of an embodiment of a clipping cosmetic tube holder 100. The clipping cosmetic tube holder 100 is configured to hold a tube and is configured to be secured to a garment by utilizing a clip element 110 and a clip connector element 120. The x-axis, y-axis, and z-axis, as shown and described herein, represent three mutually orthogonal directions relative to the orientation of the present invention.

While engaging in a physical activity such as a jog, bike ride, or sport, it can be inconvenient to carry a bag or pouch to keep small essentials on hand. Utilizing pockets can be precarious as items can fall out while on the move, and athletic attire often lacks pockets entirely. This creates a predicament for athletes or other users that rely on small cosmetic, hygienic and/or health essentials during their activity. In particular, extended outdoor physical activity often calls for the reapplication of lip balm to prevent and/or remedy chapped lips, especially in colder climates and seasons. The clipping cosmetic tube holder provides a solution to such a dilemma: a user can secure a tube containing lip balm or other cosmetic, hygienic and/or health items by utilizing the arced ribs of the clipping cosmetic tube holder, and can then clip the clipping cosmetic tube holder securely to a garment they wear during a walk, jog, bike ride, sport, or other athletic and/or physical activity by utilizing the clipping element. For example, a user can clip an embodiment of the clipping cosmetic tube holder 100 that holds a tube of lip balm to their shirt while on a jog. The user can easily remove the lip balm tube from the arced ribs during the run when they wish to apply lip balm, and can re-secure the lip balm tube within the arced ribs when the application of the lip balm is complete. The user can unclip the clipping cosmetic tube holder 100 from their shirt when they return from their run, and can later clip the clipping cosmetic tube holder to the same or different garment during a subsequent physical activity.

The clip element 110 can include a clip spine 111 with a first end 112 and a second end 114. In some embodiments, such as the embodiment shown in FIG. 1, the clip element can include a clip toe 116. A longitudinal axis 102 of the clip element runs along the clip spine from the first end 112 to the second end 114. As depicted in FIG. 1, the longitudinal axis 102 of the clip element can be parallel to the z-axis.

The clip connector element 120 can include a back portion 122, a pair of arced ribs 123 and 124, and a bridge 126. A longitudinal axis 103 of the back portion is parallel to the z-axis. As shown in FIG. 1, the longitudinal axis 103 of the back portion can also be parallel to the longitudinal axis 102 of the clip spine 111 in embodiments where the longitudinal axis 102 is also parallel to the z-axis. The bridge 126 can connect the back portion 122 of the clip element at the first end 112 of the clip spine. The pair of arced ribs 123 and 124 can be connected to the back portion 122, and can be bilaterally symmetrical with respect to a plane that includes the longitudinal axis 103 of the back portion. For example, as depicted in FIG. 1, the pair of arced ribs 123 and 124 can be bilaterally symmetrical with respect to the plane that includes the longitudinal axis 103 of the back portion and the x-axis. In other embodiments, the pair of arced ribs can be bilaterally symmetrical about another plane that includes longitudinal axis 103. The pair of arced ribs 123 and 124 can be configured to secure a cosmetic tube to the back portion by wrapping around a longitudinal section of a cylindrical surface of the cosmetic tube, further described in the discussion of FIGS. 3A-3D.

In various embodiments, the clip element and the clip connector element of the clipping cosmetic tube holder 100 are molded as a single piece of plastic material. The single piece of plastic material can include, for example, polyethylene, polypropylene, polystyrene, polyvinyl chloride, polyurethane, or other plastic material. In other embodiments, the clip element and the clip connector element can be made up of multiple plastic materials and/or other materials. The clipping cosmetic tube holder 100 can also be molded from other material such as a metal or alloy.

Figure 2A:
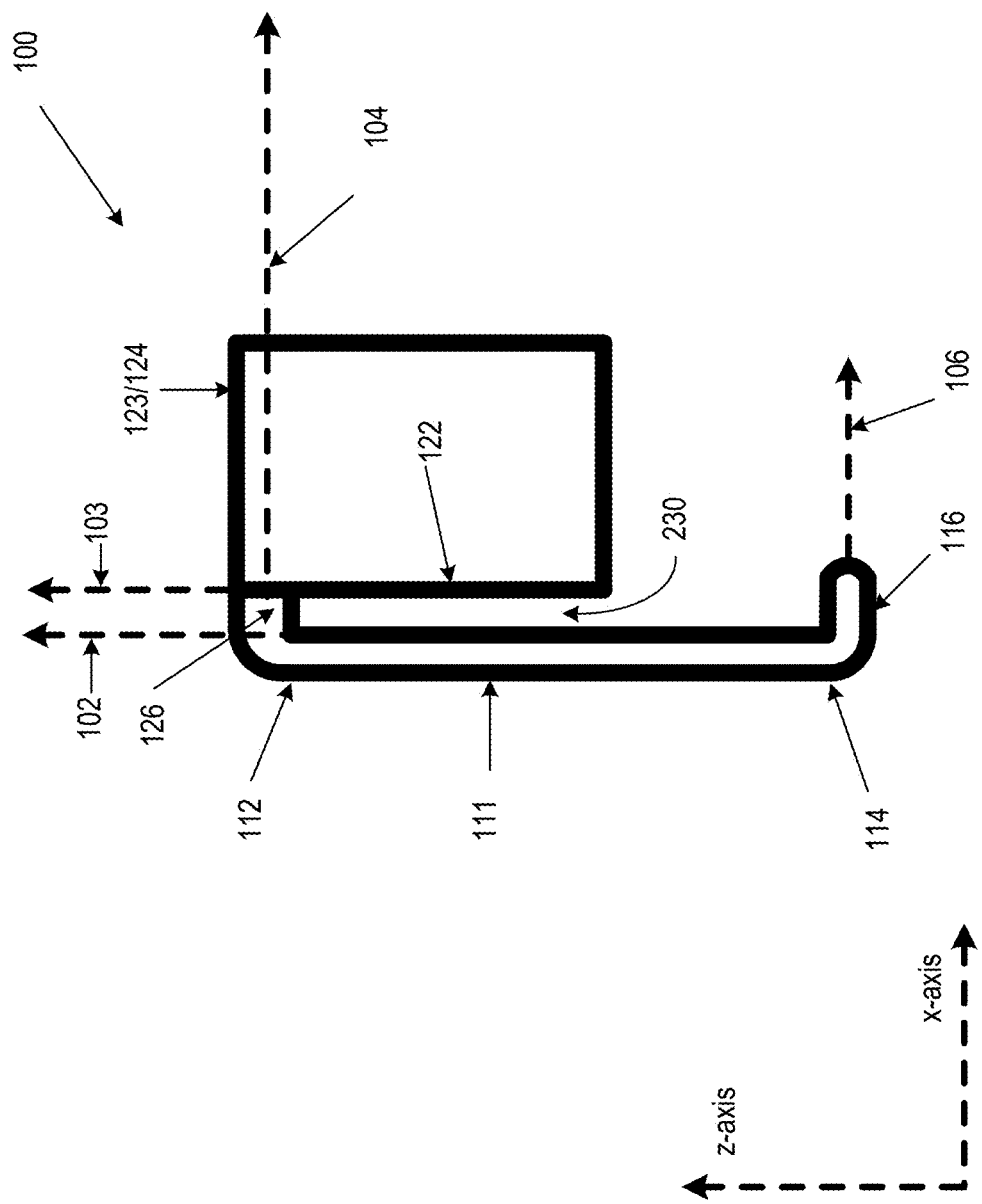
FIGS. 2A-2C are two-dimensional graphical illustrations of an embodiment of the present invention.
Figure 2B:
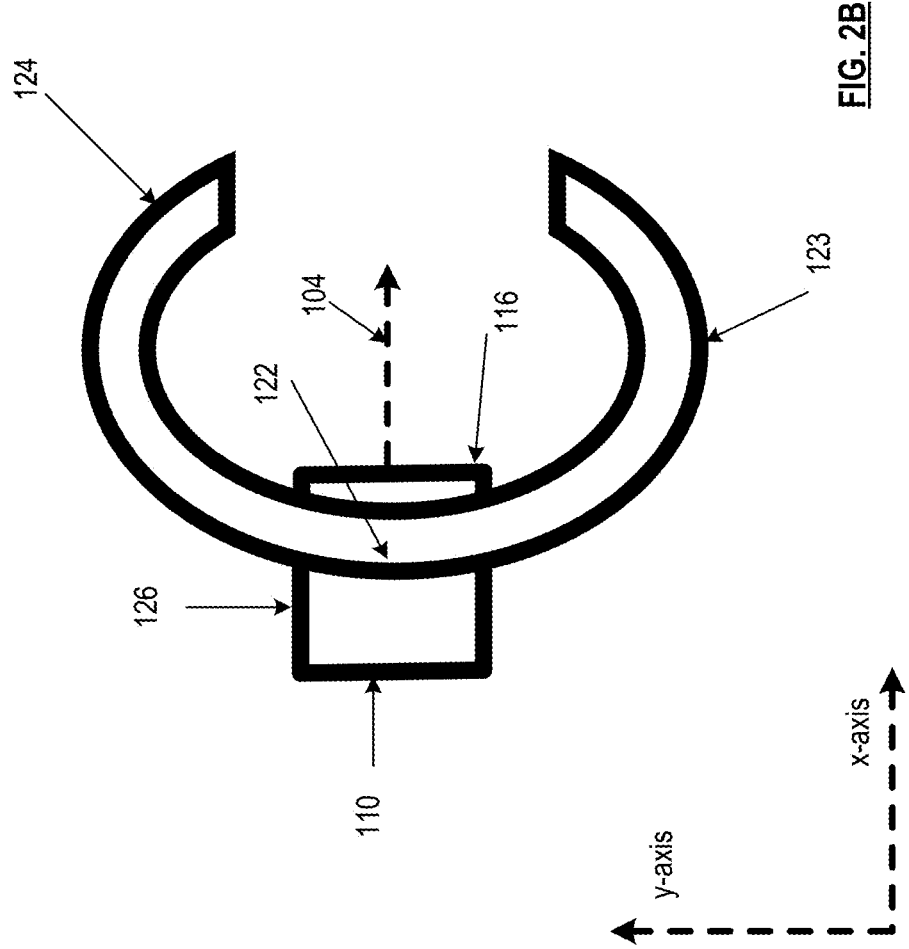
Figure 2C:
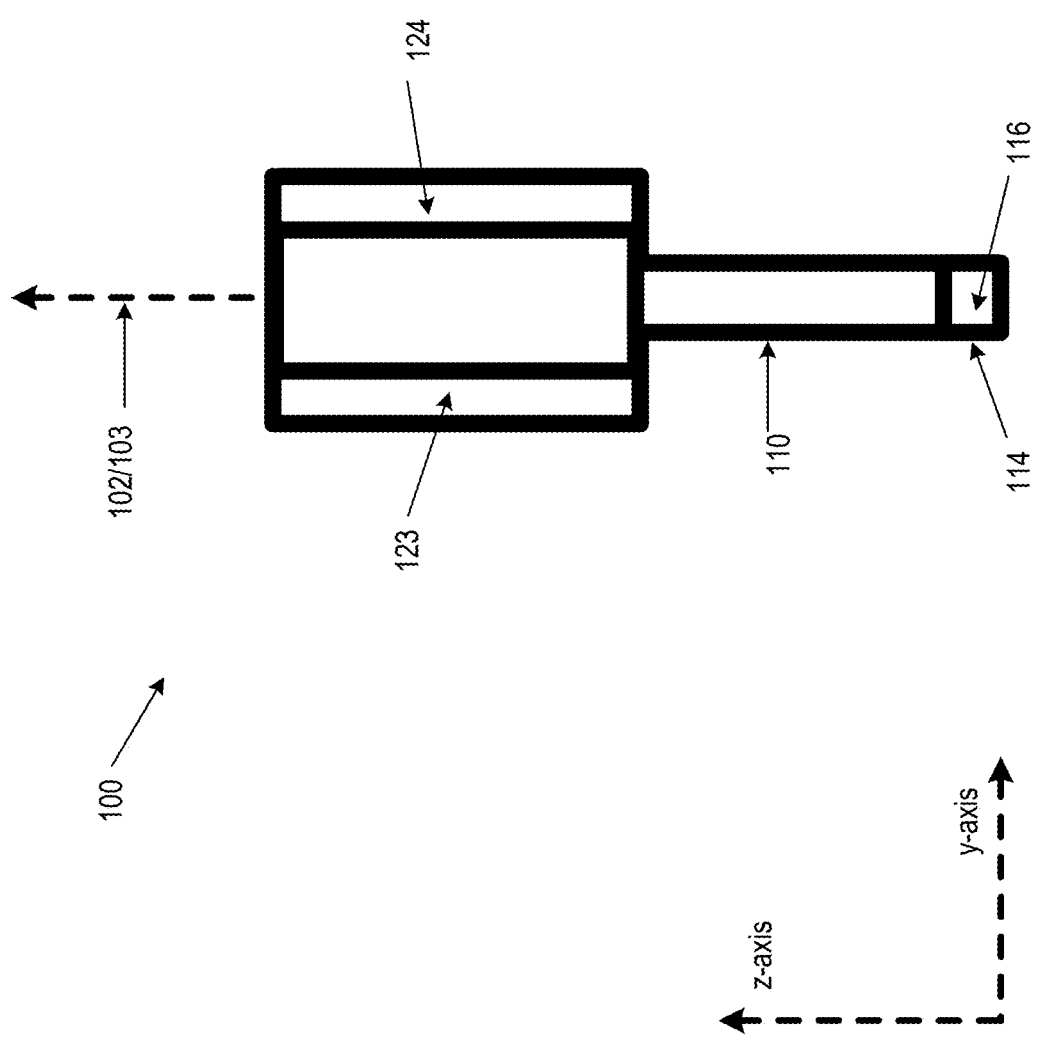

FIGS. 2A-2C are two-dimensional graphical illustrations of the embodiment of the clipping cosmetic tube holder 100 depicted in FIG. 1. FIGS. 2D-2K are two-dimensional illustrations of additional example embodiments, further described herein.

FIG. 2A is a two-dimensional graphical illustration of the clipping cosmetic tube holder 100 of FIG. 1, corresponding to a two-dimensional view along the y-axis. As shown in FIG. 2A, the offset between the back portion 122 and the clip spine 111 of the clip element can form a slot 230 between the clip spine and the back portion. This slot can be configured to secure a portion of a garment and/or other material within the slot and along the clip spine, as described further in the discussion of FIGS. 4A-4K. The offset can correspond to a length of the bridge and/or a width of the slot, for example, with respect to the x-axis.

Figure 2F:
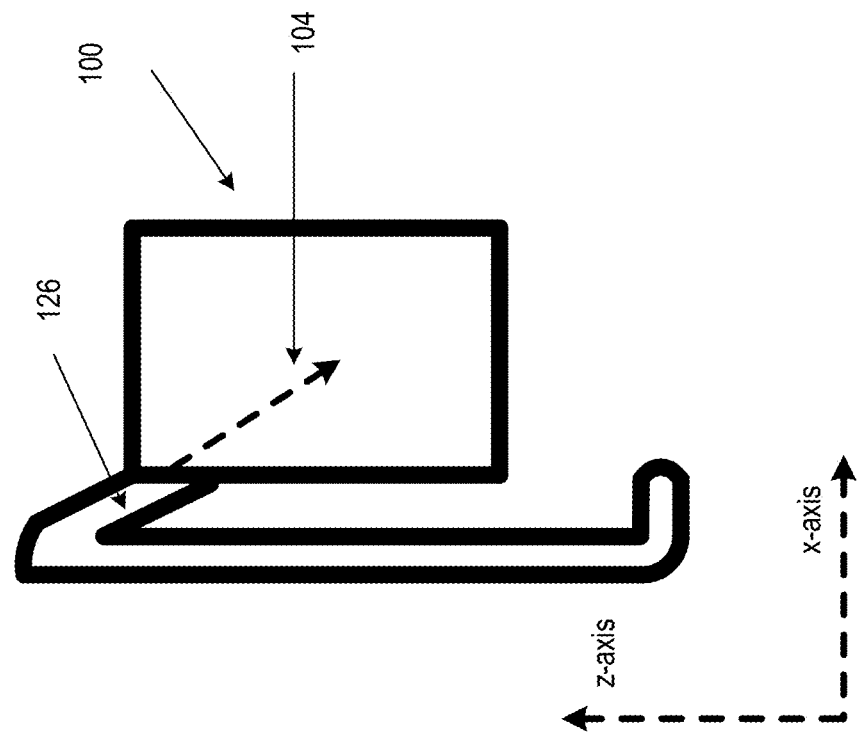
Figure 2E:
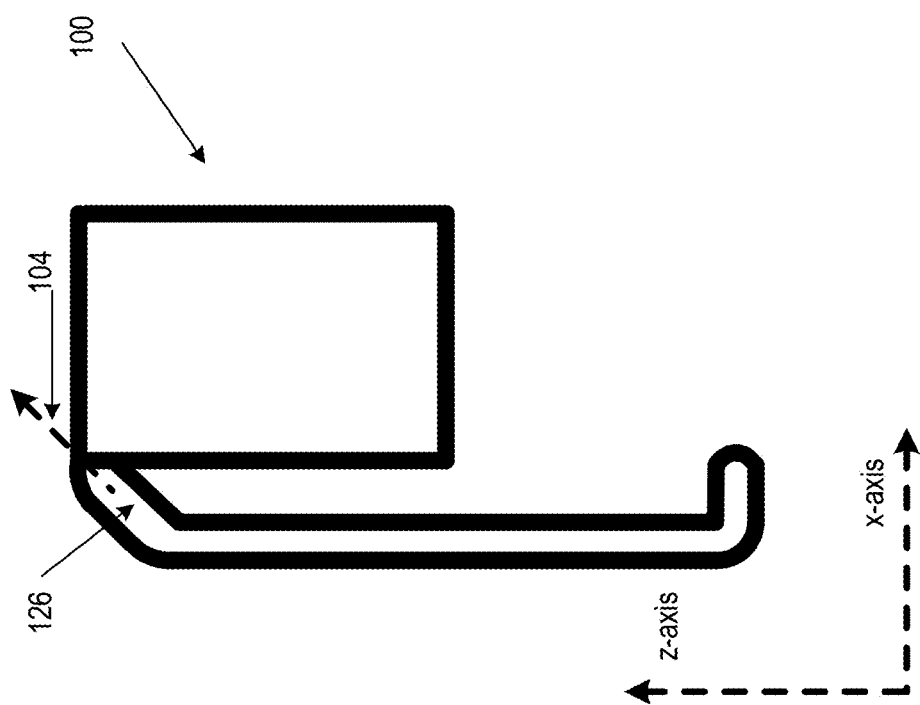

While the bridge 126 is connected to an end of the back portion 122 in FIG. 2A, the bridge can connect to any portion of the back, as depicted in FIG. 2D. The bridge can connect the back portion to the clip element along bridge axis 104, which can be parallel to the x-axis as shown in FIG. 2A, or in another direction, as depicted in FIGS. 2E and 2F.

While the clip toe is depicted protruding from the second end 114 along a clip toe axis 106 that is parallel to the x-axis in FIG. 2A, the clip toe can protrude from anywhere along the clip element 110 in any direction, for example, as illustrated in FIG. 2G. While the clip toe 116 of FIG. 2A depicts the clip toe protruding longer than the length of the bridge in the x-axis, the clip toe can be shorter, longer, or equal to the bridge in length along the bridge axis 104. In various embodiments, the clip element does not include a clip toe, as illustrated in FIG. 2H.

Figure 2I:
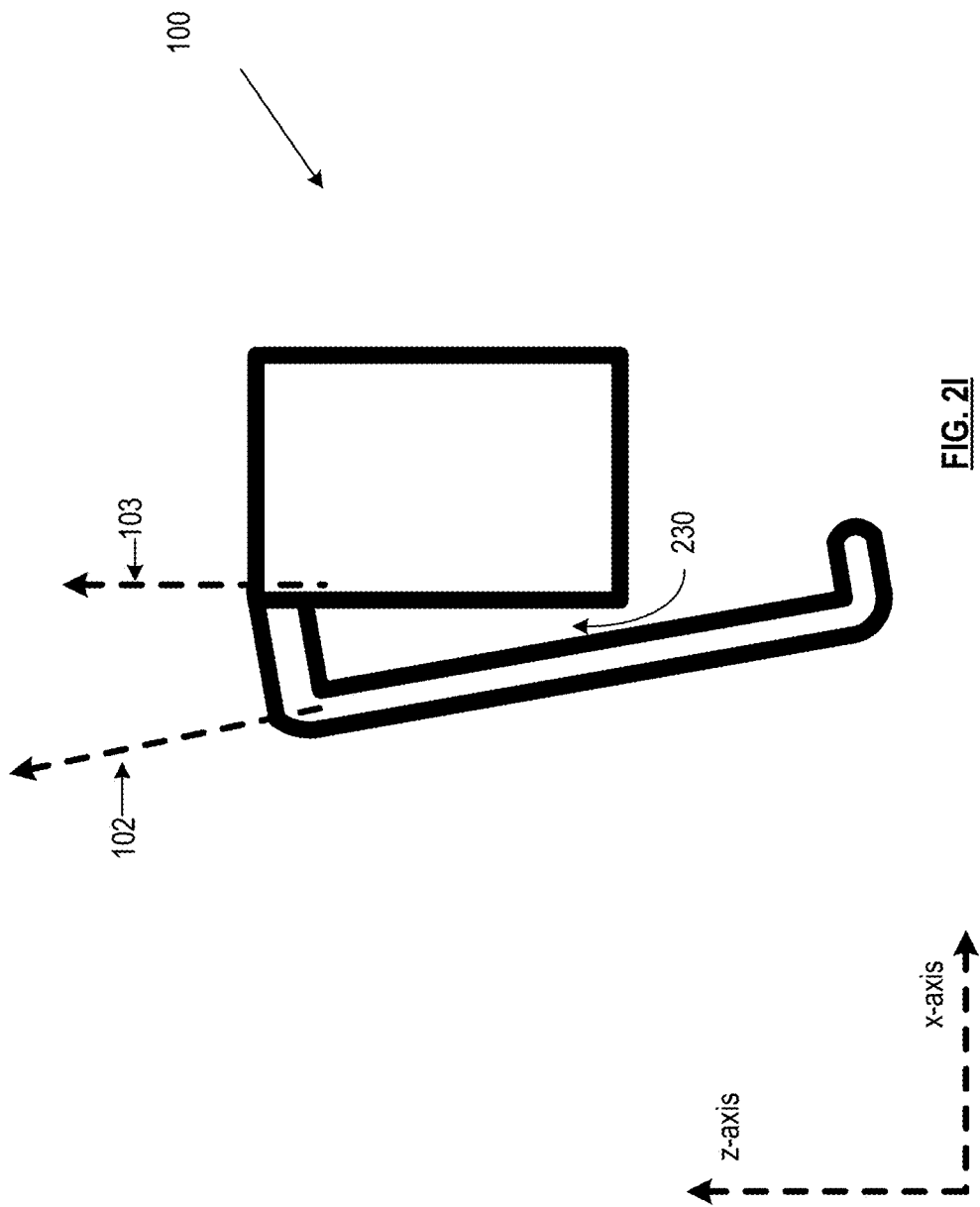

While the longitudinal axis 103 of the back portion is parallel to the longitudinal axis 102 of the clip spine 111 in FIG. 2A, the longitudinal axis 103 of the back portion can be any axis, for example, perpendicular to the y-axis and still creating a slot 230 configured to secure a garment, as shown in FIG. 2I.

Figure 2K:
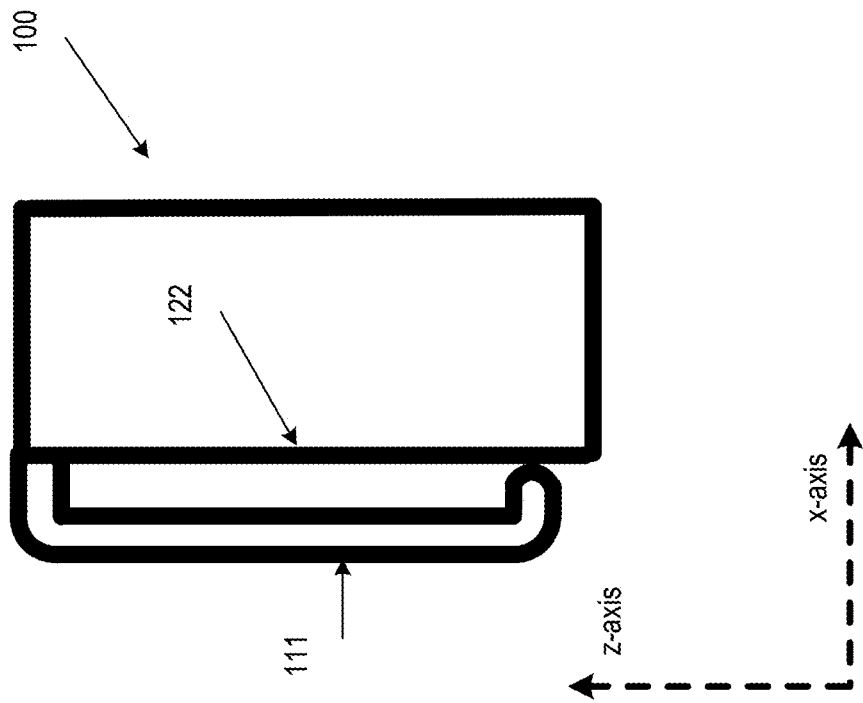
Figure 2J:
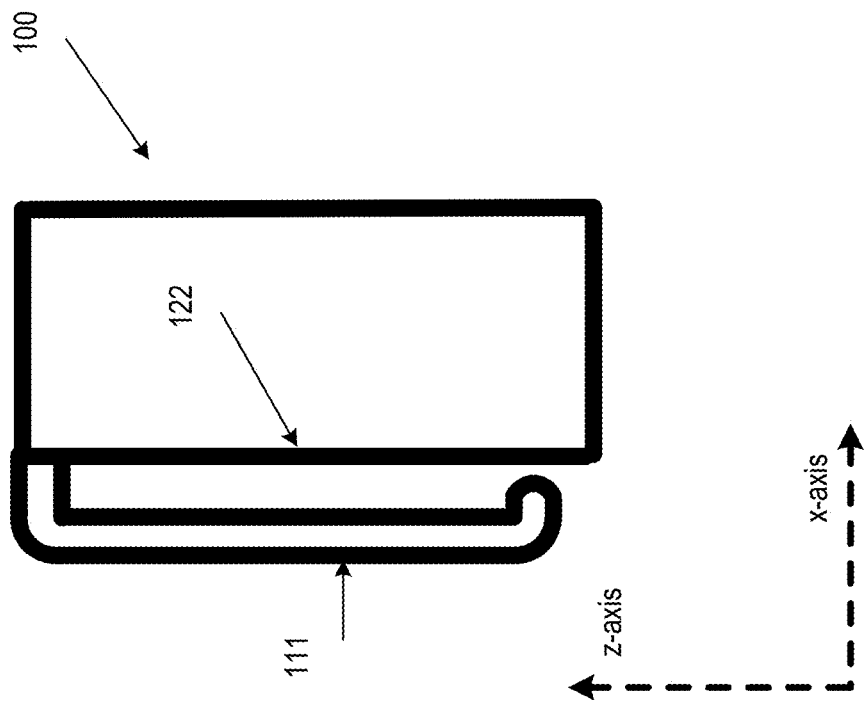

While the length of the clip spine with respect to the z-axis is longer than a length of the back portion 122 of the clip connector element 120 with respect the z-axis in FIG. 2A, the proportion of clip spine length and back portion length with respect to the z-axis can be any proportion, and can be greater than or smaller than one. For example, as shown in FIGS. 2J and 2K, the clip spine length can be shorter than the length of the back portion 122 with respect to the z-axis. In such embodiments, the length of the toe can be short enough to leave the slot 230, as depicted in FIG. 2J, or can be long enough to extend to touch the back portion, closing the gap in a neutral position as depicted in FIG. 2K. In such an embodiment, the spine element can be configured to move to a second position when a garment is inserted, for example, where elastic deformation is induced of the spine element as a result of the insertion of the garment.

FIG. 2B includes a two-dimensional graphical illustration of the clipping cosmetic tube holder 100 of FIG. 1, corresponding to a two-dimensional view in a direction opposite the z-axis. While the clip toe 116 is long enough in the x-axis to be visible in this embodiments, in other embodiments, the clip toe 116 may be too short to be visible, as it would be obstructed by the bridge 126 and the back portion 122.

FIG. 2C includes a two-dimensional graphical illustration of the clipping cosmetic tube holder 100 of FIG. 1, corresponding to a two-dimensional view in a direction opposite the x-axis.

Figure 2M:
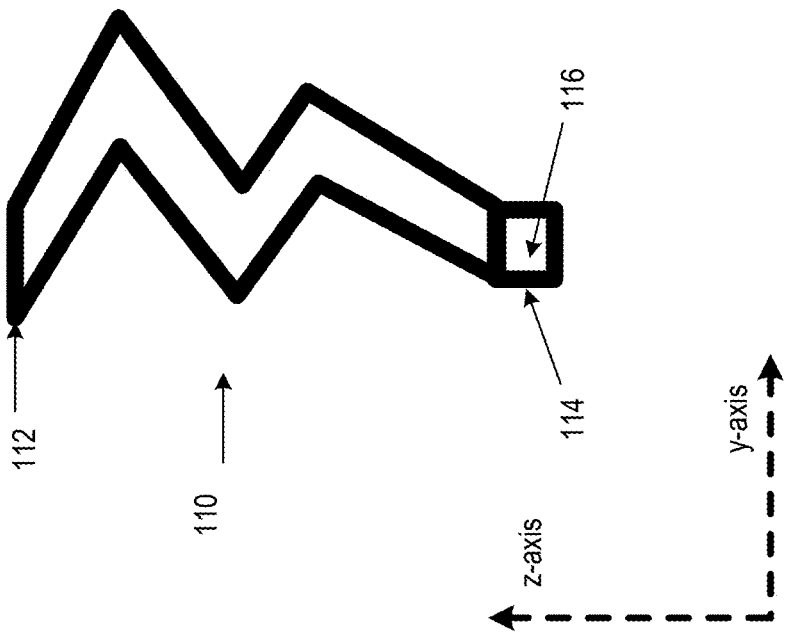
FIGS. 2L-2M are two-dimensional graphical illustrations of example clip elements in accordance with the present invention.
Figure 2L:
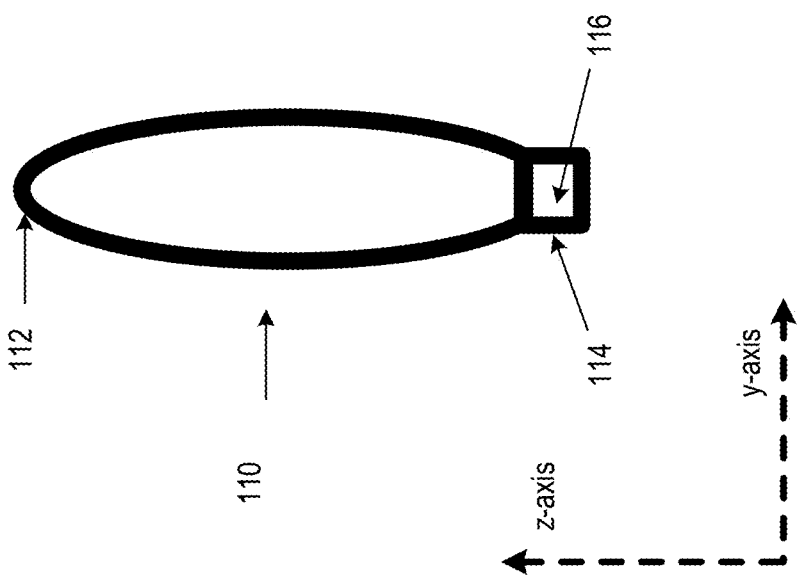

While the clip element as depicted as a rectangular rod, the clip element can be any shape, such as a cylindrical rod, an elliptical rod, or another shape, as illustrated in FIG. 2L.

The clip element can be symmetrical with respect to the longitudinal axis 102. In other embodiments, the clip element can be a shape that is asymmetrical with respect to the longitudinal axis 102, as illustrated in FIG. 2M.

Figure 3A:
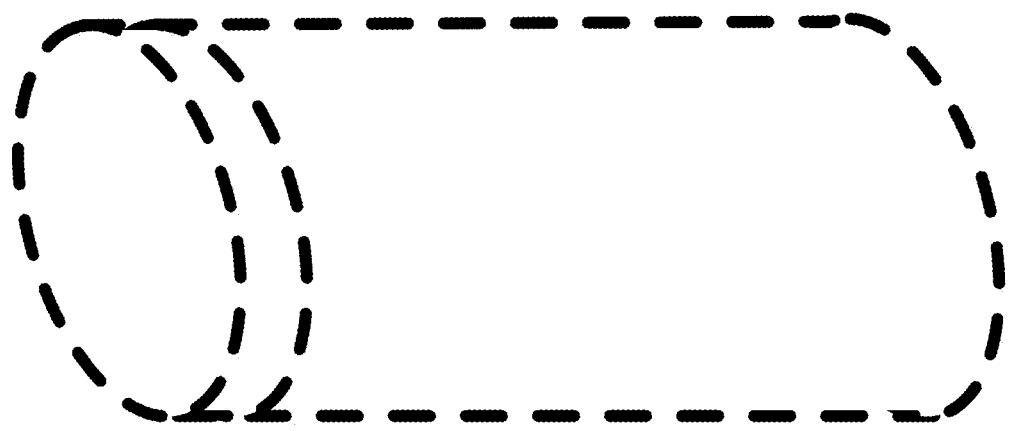
FIG. 3A is a three-dimensional graphical illustration of an embodiment of the present invention while holding a cosmetic tube.
Figure 3A:
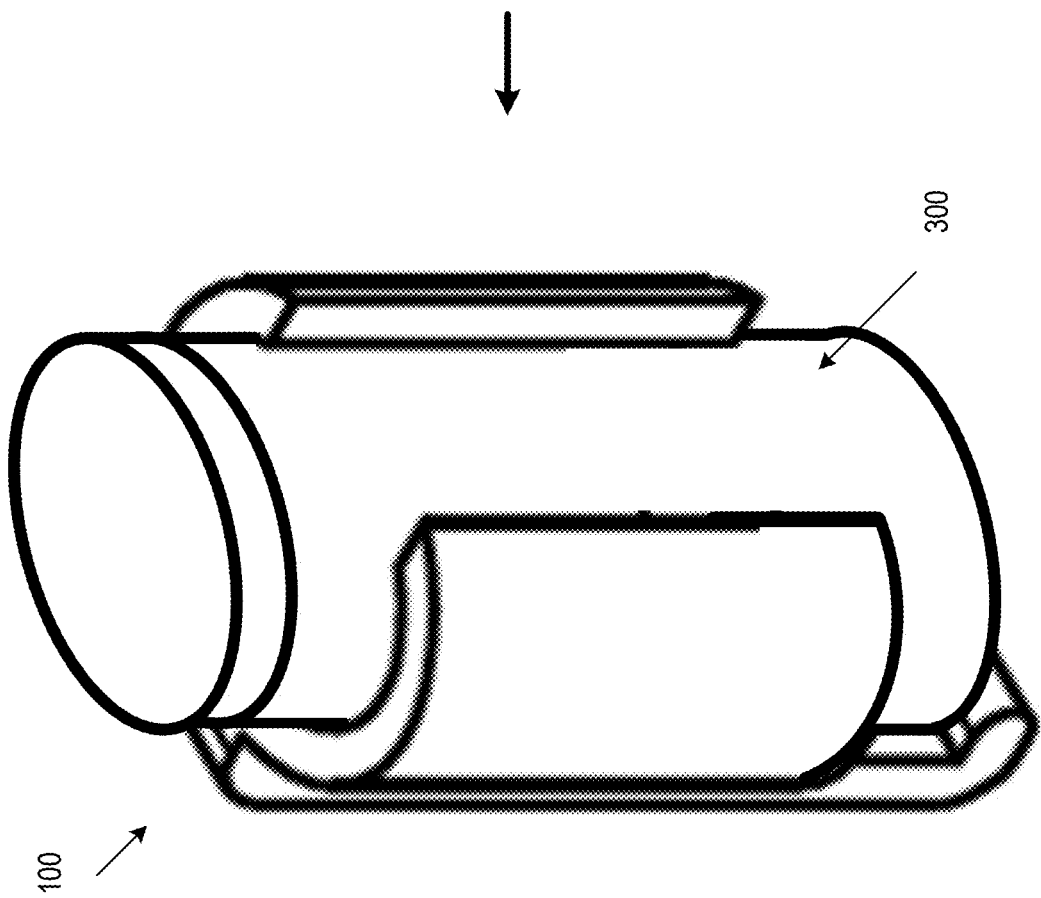
Figure 3B:
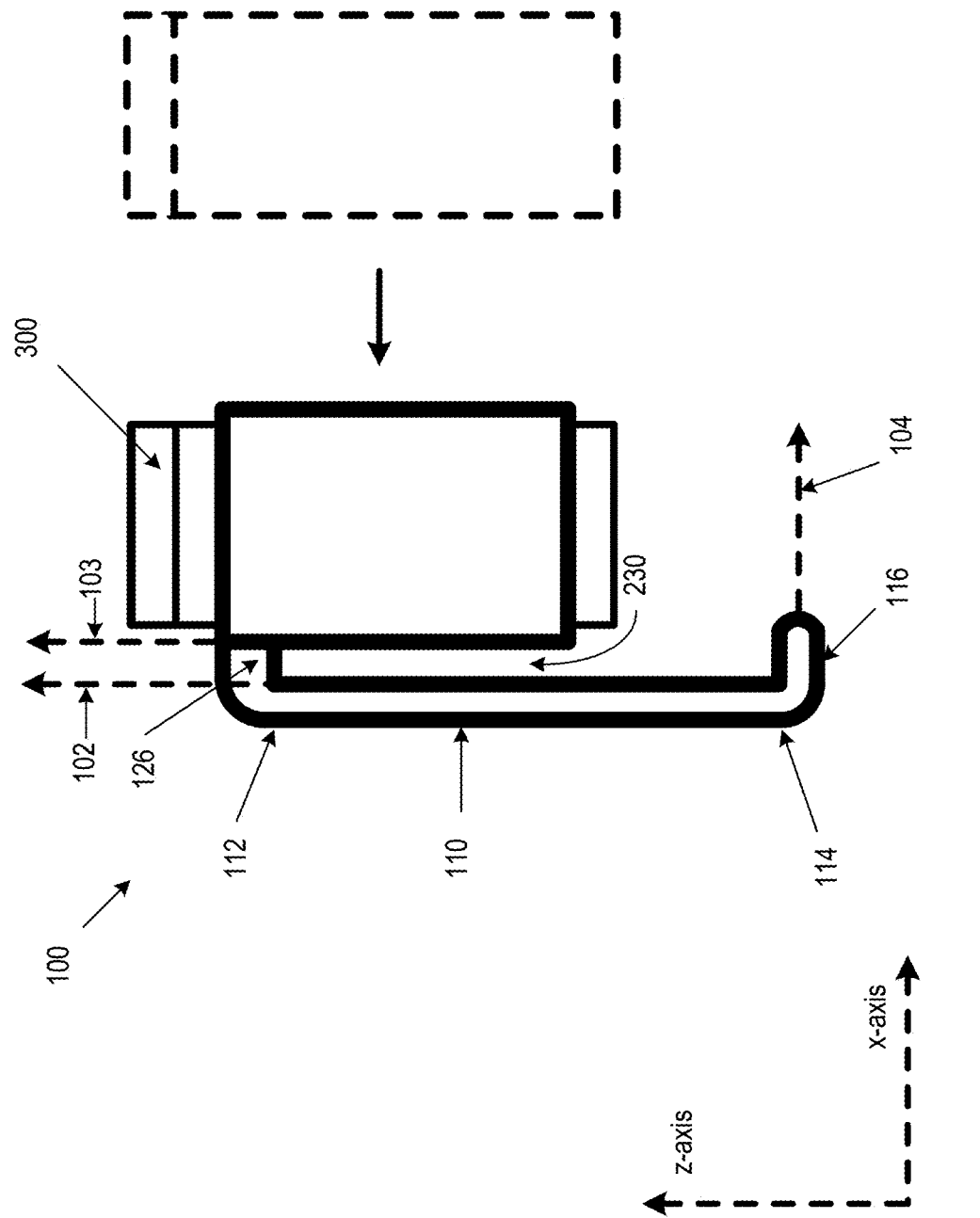
FIGS. 3B-3D are two-dimensional graphical illustrations of an embodiment of the present invention while holding a cosmetic tube.
Figure 3C:
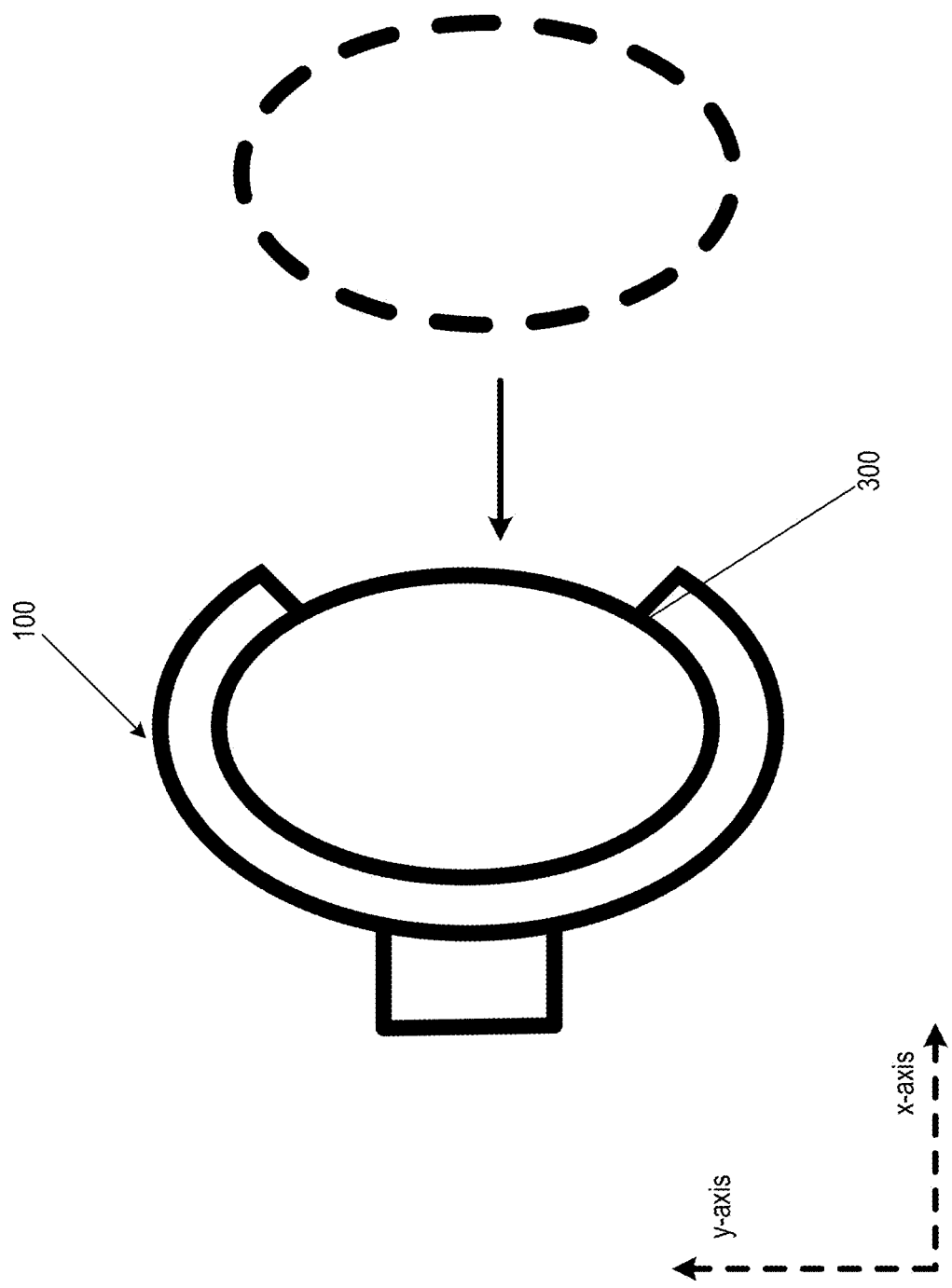
Figure 3D:
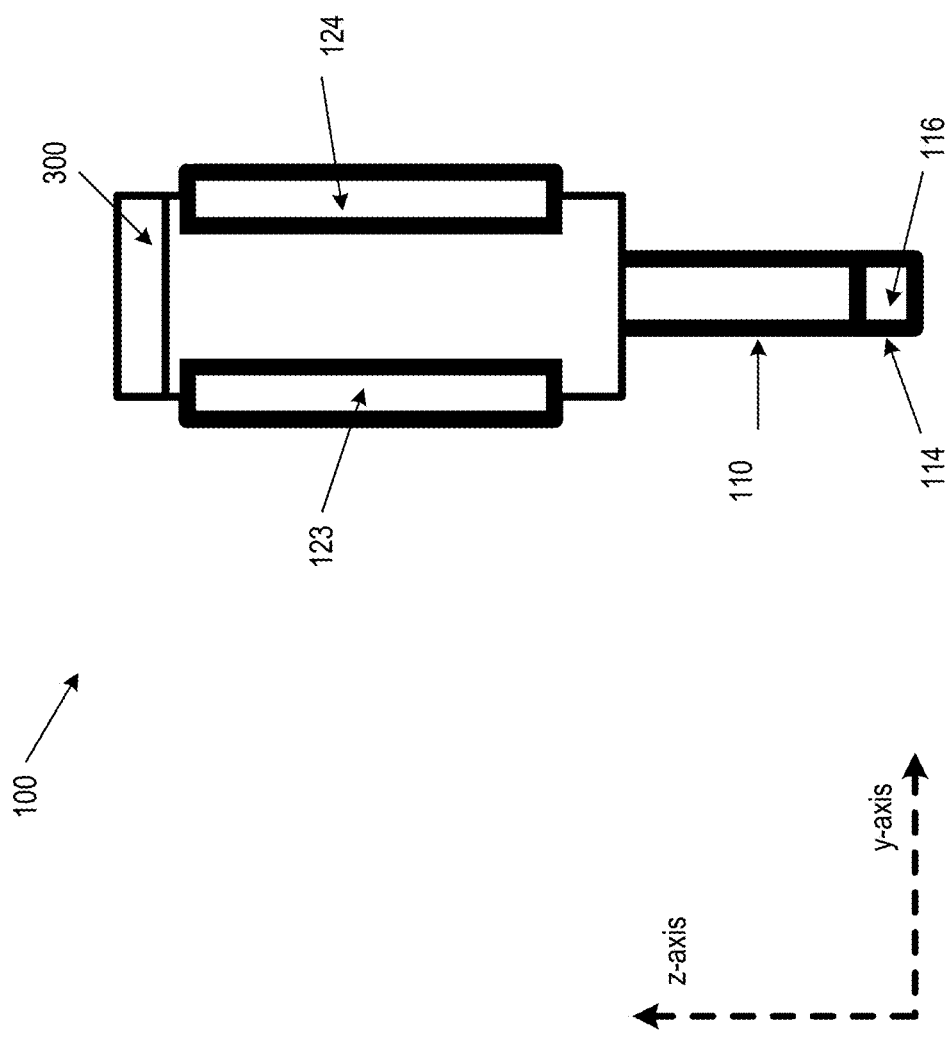

FIG. 3A is a three-dimensional graphical illustration of the clipping cosmetic tube holder 100 of FIG. 1 that is holding a cosmetic tube 300. FIGS. 3B-3D are two dimensional views of clipping cosmetic tube holder 100 of FIG. 1, corresponding to the views of FIGS. 2A-2D, while clipping cosmetic tube holder 100 is holding the cosmetic tube 300. The cosmetic tube 300 can be a cylindrical tube with an elliptical base. In some embodiments, the elliptical base is a circle.

As used herein, a cosmetic tube can include, for example, a cylindrical tube containing lip balm, lipstick, lip gloss, sunscreen, mascara, eyeliner, perfume, body spray, deodorant, bug repellant, hand sanitizer and/or other cosmetic, health, and/or hygienic products. The clipping cosmetic tube holder 100 can also be configured to hold other cylindrical tubes, such as cylindrical containers that contain pills. For example, the clipping cosmetic tube holder 100 can be configured to hold a tube of prescription medication. The clipping cosmetic tube holder 100 can be configured to hold a cylindrical storage container, where the cylindrical storage container carries cash, coins, jewelry, and/or other personal items. The clipping cosmetic tube holder 100 can be configured to hold tubes containing edible materials such as food, water or other beverages, energy gels, and/or other consumable goods.

The cosmetic tube includes a cylindrical surface. As used herein the base shape of the cosmetic tube corresponds to the shape of the cross-section of the cylindrical surface. For example, the base shape can be dictated by a major axis and a minor axis of an ellipse of the cross section of the cylindrical surface. As used herein, the circumference of the cosmetic tube corresponds to the circumference of a cross-section of the cylindrical surface. Thus, the clipping cosmetic tube holder 100 can be configured to hold a cylindrical portion of any object that may not be considered cylindrical in its entirety.

The clipping cosmetic tube holder 100 can securely hold cosmetic tube 300 while oriented in any position or orientation, and while changing position and/or orientation. For example, when the z-axis is oriented opposite the direction of a gravitational force, the cosmetic tube 300 is held in place by the frictional force in the direction of the z-axis induced by the opposing forces of ribs 123 and 124 pushing against the cylindrical surface in directions perpendicular to the z-axis. Furthermore, the clipping cosmetic tube holder 100 can withstand additional forces of acceleration and deceleration in some and/or all directions. For example, such forces are induced when a user of the clipping cosmetic tube is engaging in an activity such as walking, running, or other physical activity that would cause the clipping cosmetic tube holder to bounce around. The clipping cosmetic tube holder 100 can continue to securely hold cosmetic tube 300 while enduring such variable acceleration.

In some embodiments, to ensure this frictional force is strong enough to secure cosmetic tube 300 in place, the inner surface of ribs 123 and 124 that makes contact with the cosmetic tube can be coated and/or lined with a different material, such as a rubber or adhesive material, that provides a higher coefficient of friction than the rest of the material of the clipping cosmetic tube holder 100. In various embodiments, such a coating and/or lining can be attached separately. For example, the coating and/or lining can be attached to the inside of the ribs 123 and 124 via an adhesive backing, and a user can elect to attach the coating and/or lining when cosmetic tube 300 is particularly smooth, when the cosmetic tube 300 exceeds a certain weight, and/or when the circumference of the base of cosmetic tube 300 is below a threshold circumference. In various embodiments, such a coating and/or lining can instead be applied to the cosmetic tube itself. In various embodiments, the coating and/or lining is removable and can be applied repeatedly. In other embodiments, the inside of ribs 123 and 124 can be textured, for example, with a rough texture and/or with tiny bumps, to provide a high enough coefficient of friction to support the cosmetic tube 300.

Alternatively or in addition to enabling this higher coefficient of friction along the inside of ribs 123 and 124, a higher strength of the opposing forces can also be utilized to increase the frictional force securing the cosmetic tube in place. The ribs of clipping cosmetic tube holder 100 can be configured to have a set neutral position when no cosmetic tube is inserted, where the elliptical space of the neutral position of ribs 123 and 124 is marginally smaller than the base shape and/or circumference of the of the cosmetic tube 300. The opposing forces induced by ribs 123 and 124 can thus be a function of the elastic deformation of the ribs 123 and 124 induced by the insertion of the tube, as the ribs push back towards their neutral position, and a function of the Young's modulus of the material of the ribs 123 and 124.

Figure 3E:
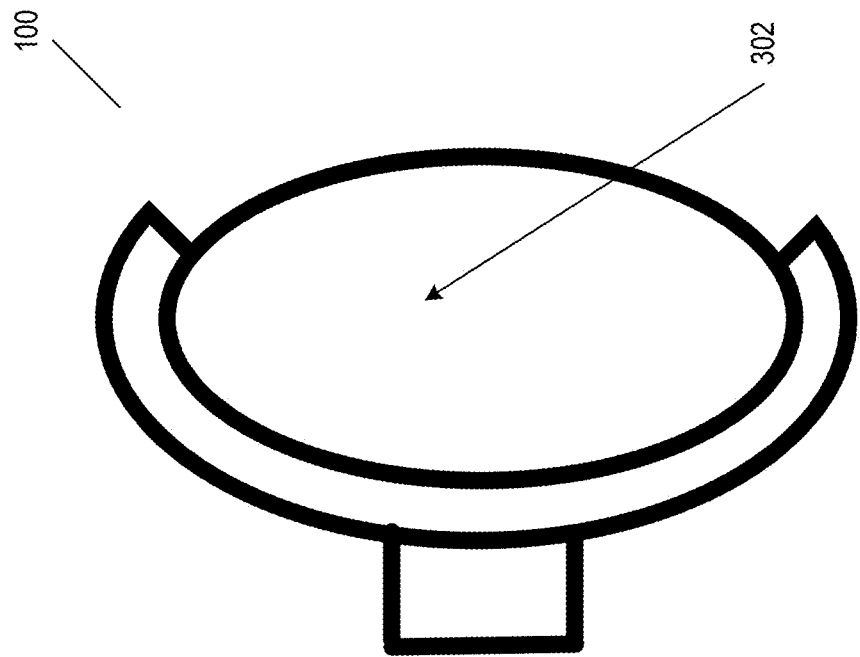
FIGS. 3E-3Y are two-dimensional graphical illustrations of example embodiments of the present invention.
Figure 3E:
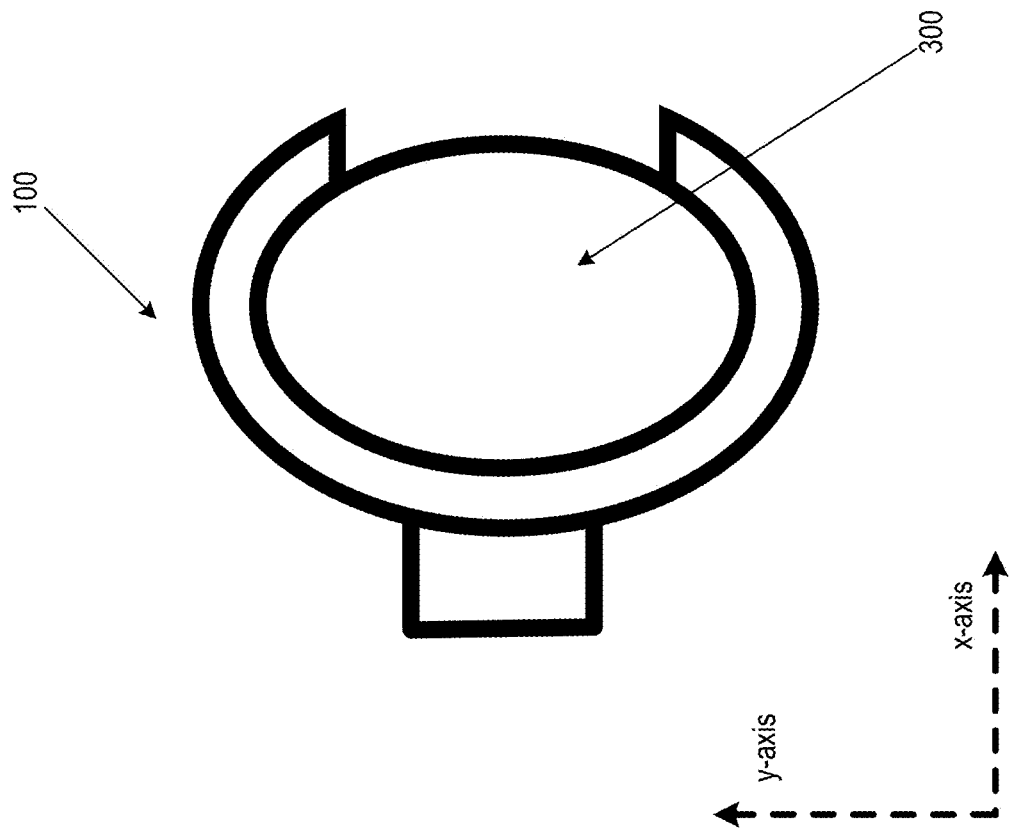

In some embodiments, the clipping cosmetic tube holder is configured to hold tubes with of the same base shape and/or circumference. In other embodiments, the ribs of the clipping cosmetic tube can be configured to hold tubes of a range of elliptical base shapes and/or circumferences. In such embodiments, the ribs 123 and 124 can stretch from a first position to hold a second cosmetic tube 302 of a larger circumference at a second position, as depicted in FIG. 3E. The range of base shapes and/or circumferences that the clipping cosmetic tube holder can support can be fixed, and can be a function of the Young's modulus of the ribs 123 and 124.

Figure 3H:
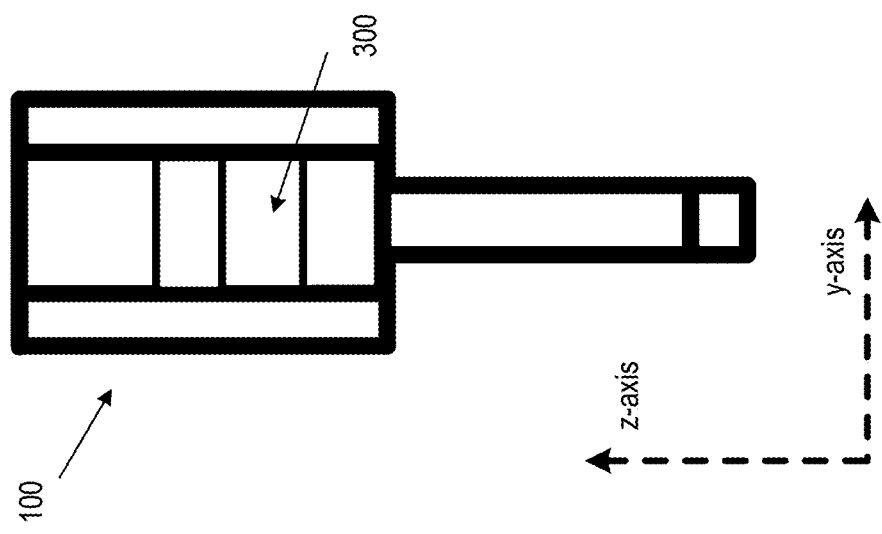
Figure 3G:
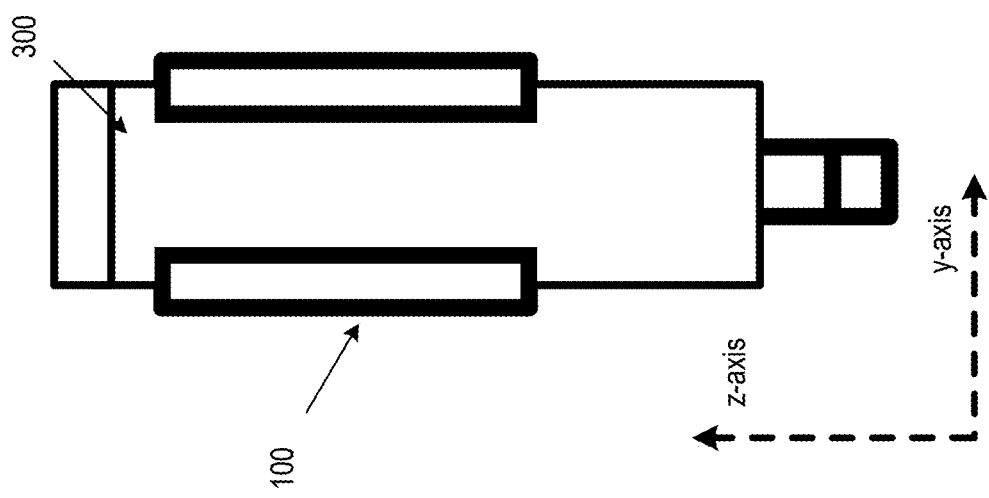
Figure 3F:
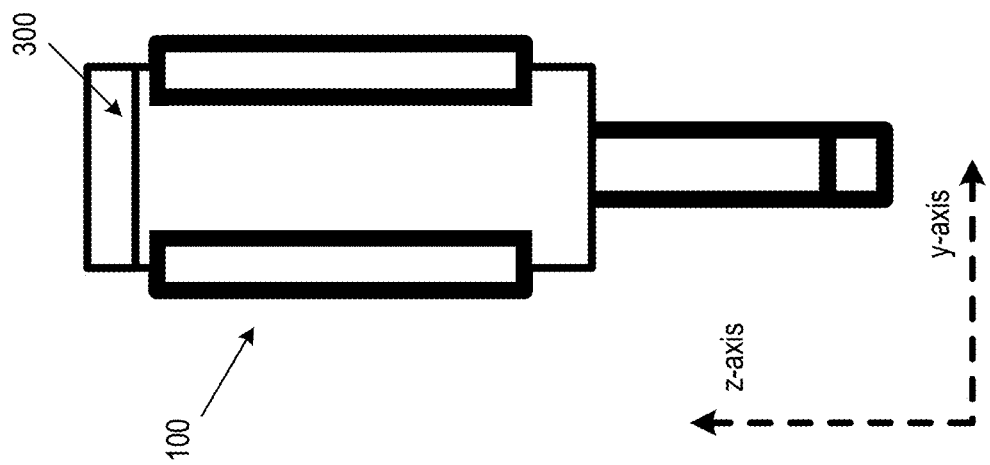

In various embodiments, the clipping cosmetic tube holder 100 can hold tubes with different heights, as depicted in FIGS. 3F-3H. For example, the clipping cosmetic tube holder can hold tubes of varying heights that have base shapes and/or circumferences within the fixed range. As shown in FIG. 3H, the cosmetic tube 300 can be shorter than a height of the ribs 123 and 124, and the entire height of the cylindrical surface of the cosmetic tube can be encompassed by the ribs.

Furthermore, the same cosmetic tube can be held in different positions along the ribs, as depicted in FIGS. 3I-3K. As shown in FIG. 3L, the same cosmetic tube can also be secured by the clipping cosmetic tube holder 100 when oriented about a 180-degree rotation about the z-axis. In some embodiments so long as a threshold area of the cylindrical surface is held within the ribs, or threshold proportion of total area of the cylindrical surface is held within the ribs, the cosmetic tube will be supported.

Figure 3N:
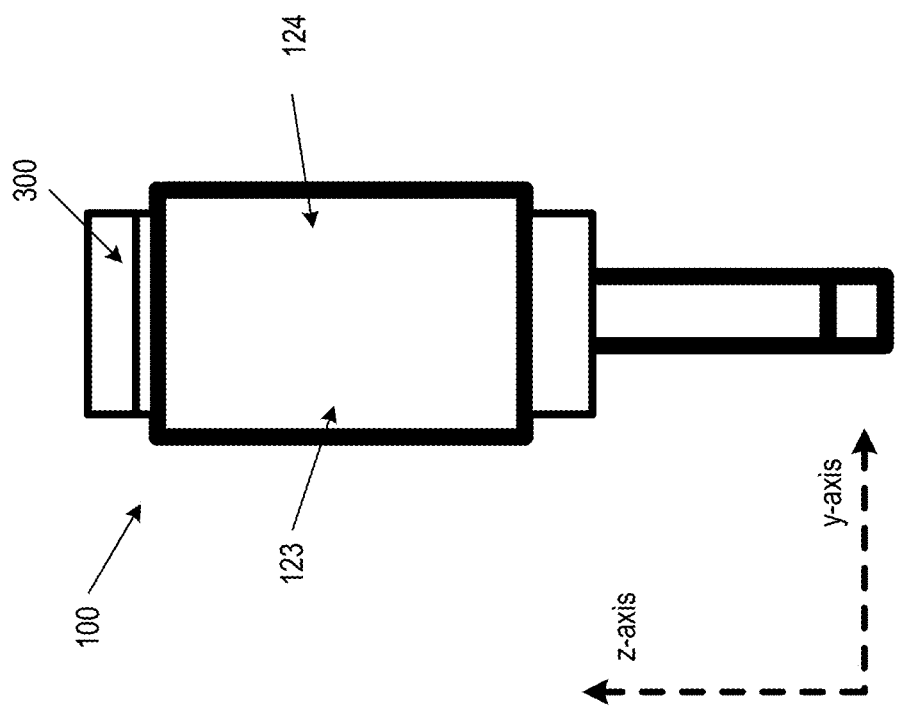
Figure 3M:
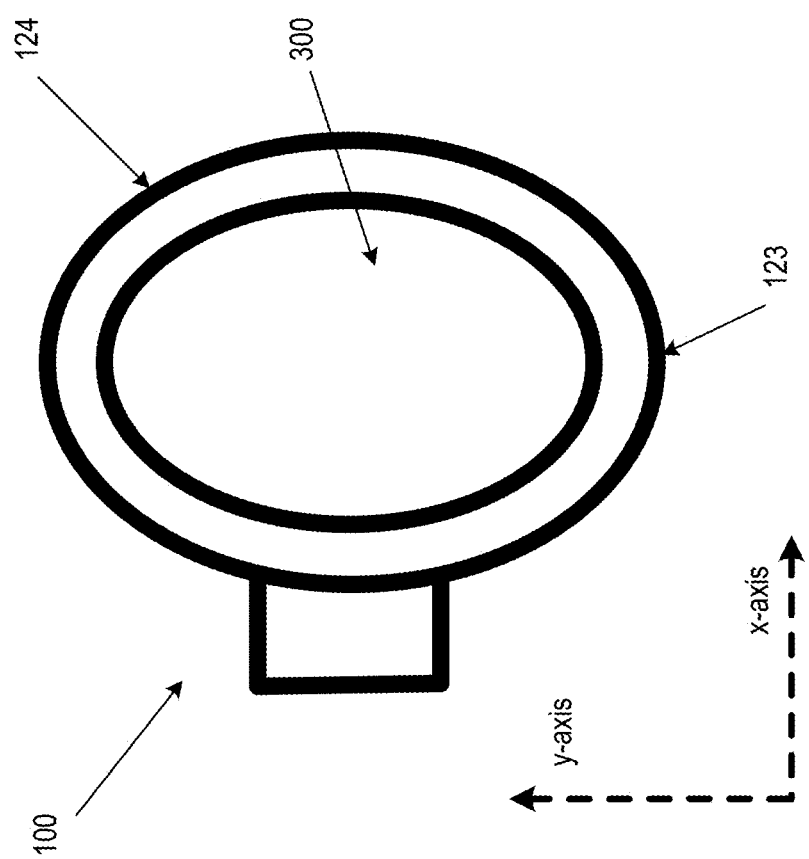

As depicted in FIGS. 3C and 3D, the pair of arced ribs can each have an arc length less than half of a circumference of the cosmetic tube, creating a gap between the ribs opposite and parallel to the back portion. In other embodiments, the pair of arced ribs can create a complete ellipse, fully encompassing the cosmetic tube, for example, where the ribs can attach and/or detach opposite to the back portion or can be permanently attached in the complete ellipse, as depicted in FIGS. 3M and 3N. In some embodiments, to ensure the cosmetic tube is secured, the arc length of each of the pair of arced ribs is greater than one quarter of the circumference of the cosmetic tube, as depicted in FIGS. 3C-3D.

Figure 3P:
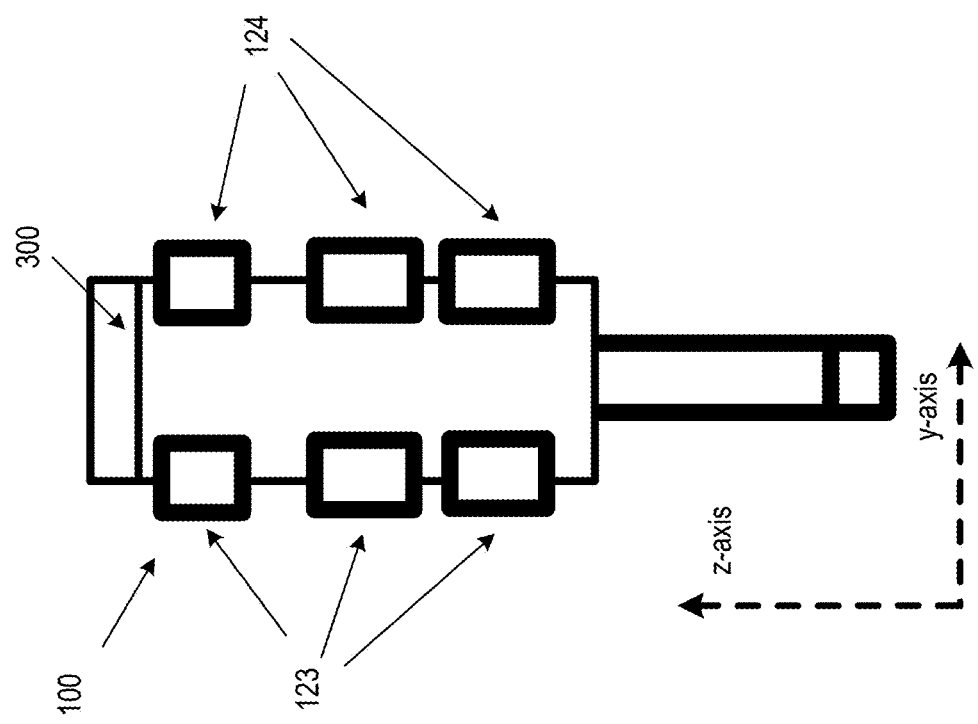
Figure 3O:
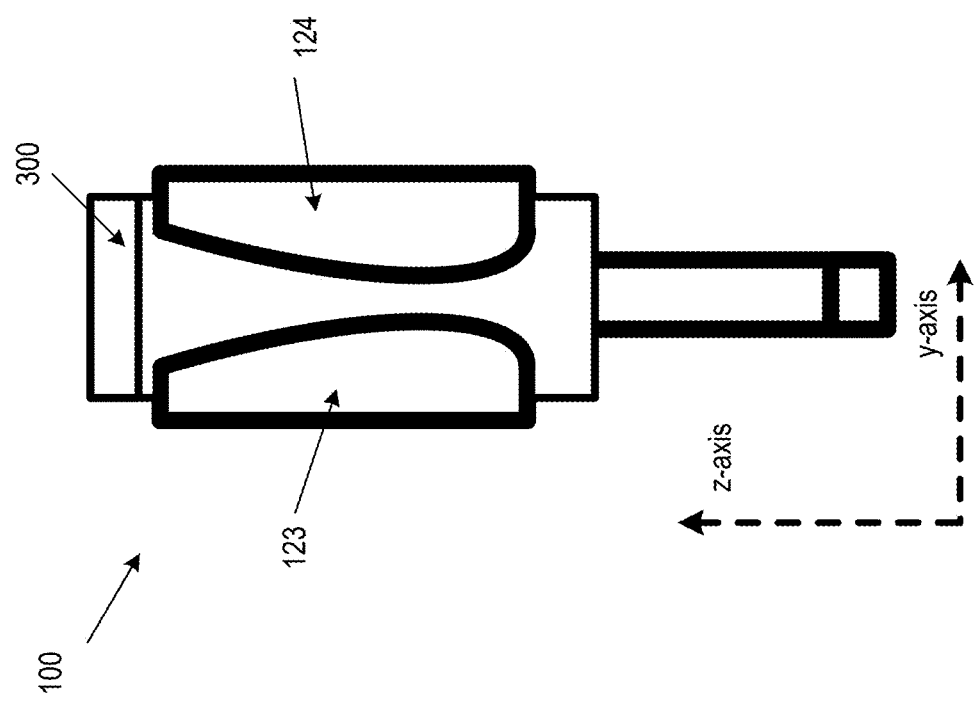
Figure 3R:
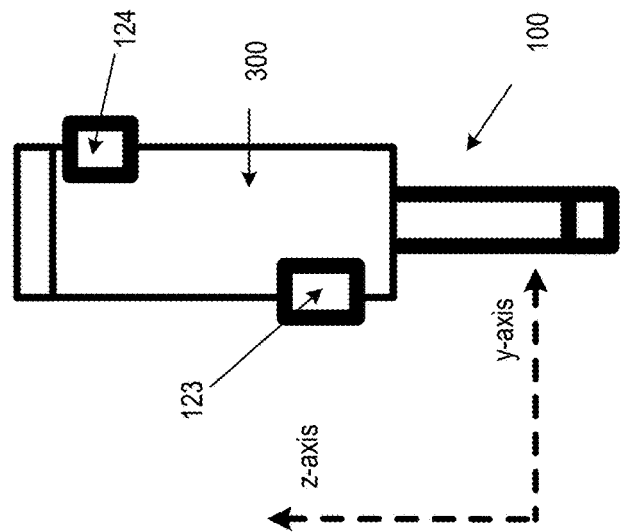
Figure 3S:
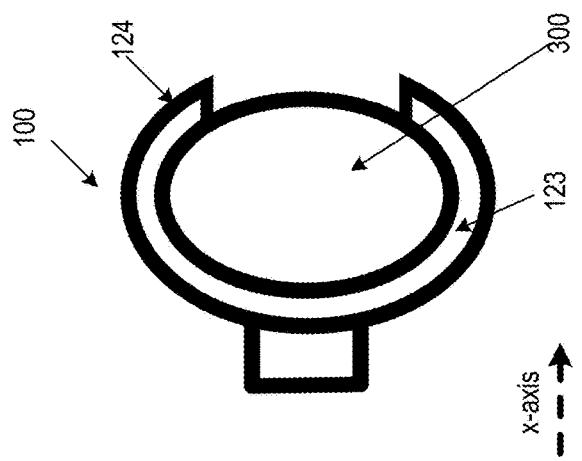
Figure 3Q:
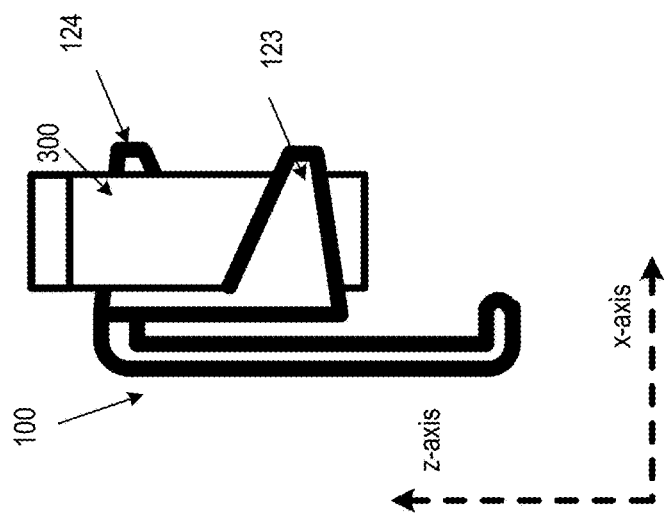

While ribs 123 and 124 cut-off vertically in FIG. 2C, ribs 123 and 124 can be configured to wrap around any portion of the cylindrical surface of the cosmetic tube 300. Thus, while the cylindrical surface of the cosmetic tube in contact with the ribs 123 and 124 in FIG. 2C corresponds to a rectangle in two dimensions, the ribs can wrap around the ribs in a different manner in other embodiments, for example, as illustrated in 30. In some embodiments, ribs 123 and 124 can include multiple, separate ribs on each side of the back portion that correspond to the longitudinal section of a cylindrical surface of the same circumference, as shown in FIG. 3P, where the separate ribs are connected along the back portion. In various embodiments, the ribs 123 and 124 are not bilaterally symmetrical. FIGS. 3Q-3S illustrate such embodiment of a clipping cosmetic tube holder 100 from 3 orthogonal views. The clipping cosmetic tube holder 100 of FIGS. 3Q-3S has ribs 123 and 124 to secure cosmetic tube 300 that are not bilaterally symmetrical, and instead only symmetrical about the x-axis.

Figure 3Y:
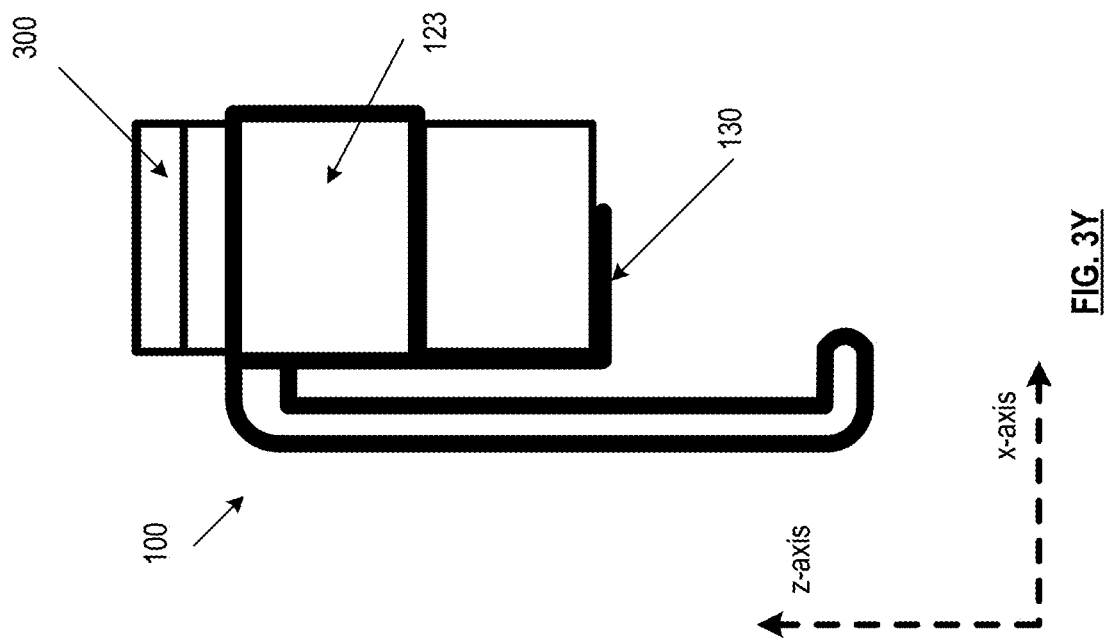
Figure 3X:
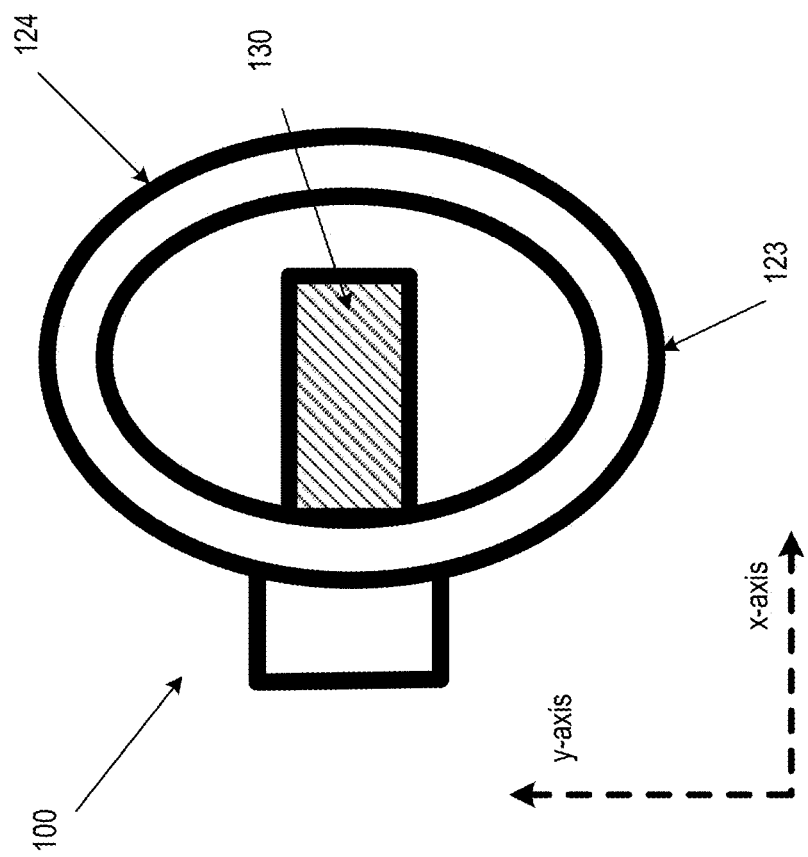

FIGS. 3T-3Y illustrate embodiments where a clipping cosmetic tube holder includes a ledge 130, depicted as a shaded region in FIG. 3T to illustrate that this is a solid surface of the clipping cosmetic tube holder parallel to the plane formed by the x-axis and y-axis. Such a ledge can be ideal in some embodiments to ensure that the cosmetic tube does not fall through the arced ribs, for example, if the frictional forces are not strong enough to keep the cosmetic tube secure. As shown in FIG. 3T, the ledge 130 can completely connect the inner surfaces of the arced ribs, where the circumference and area of the ledge corresponds to the circumference and area of the elliptical cross-sectional area imposed by the arced arms. As shown in FIG. 3U, this ledge 130 can be connected to a bottom end of the arced ribs with respect to the z-axis, allowing the cosmetic tube 300 within the arced ribs to rest on the ledge 130, for example, if the z-axis is oriented opposite a gravitational force. In such embodiments, the clipping cosmetic tube holder can be configured to hold cosmetic tubes 300 with circumferences and/or base shapes that are smaller than the circumference and/or area of the elliptical cross-sectional area imposed by the arced arms, for example, as shown in FIGS. 3V and 3W, where the ledge 130 is integral in securing such cosmetic tubes. In some embodiments, ledge 130 does not completely connect the inner surfaces of the arced ribs, and can be any shape or size, as shown in FIG. 3X. Furthermore, the ledge 130 can connect anywhere along the back portion 122, within the arced ribs or with space between the arced ribs, as shown in FIG. 3Y.

FIGS. 4A-4K illustrate a clipping cosmetic tube holder 100 that is secured to a garment in accordance with various embodiments. As used herein, a cosmetic tube holder that is "clipped" to a garment is securing a portion of the garment between the clip spine 111 of the clip element 110 and the back portion 122 of the clip connector element 120.

Figure 4A:
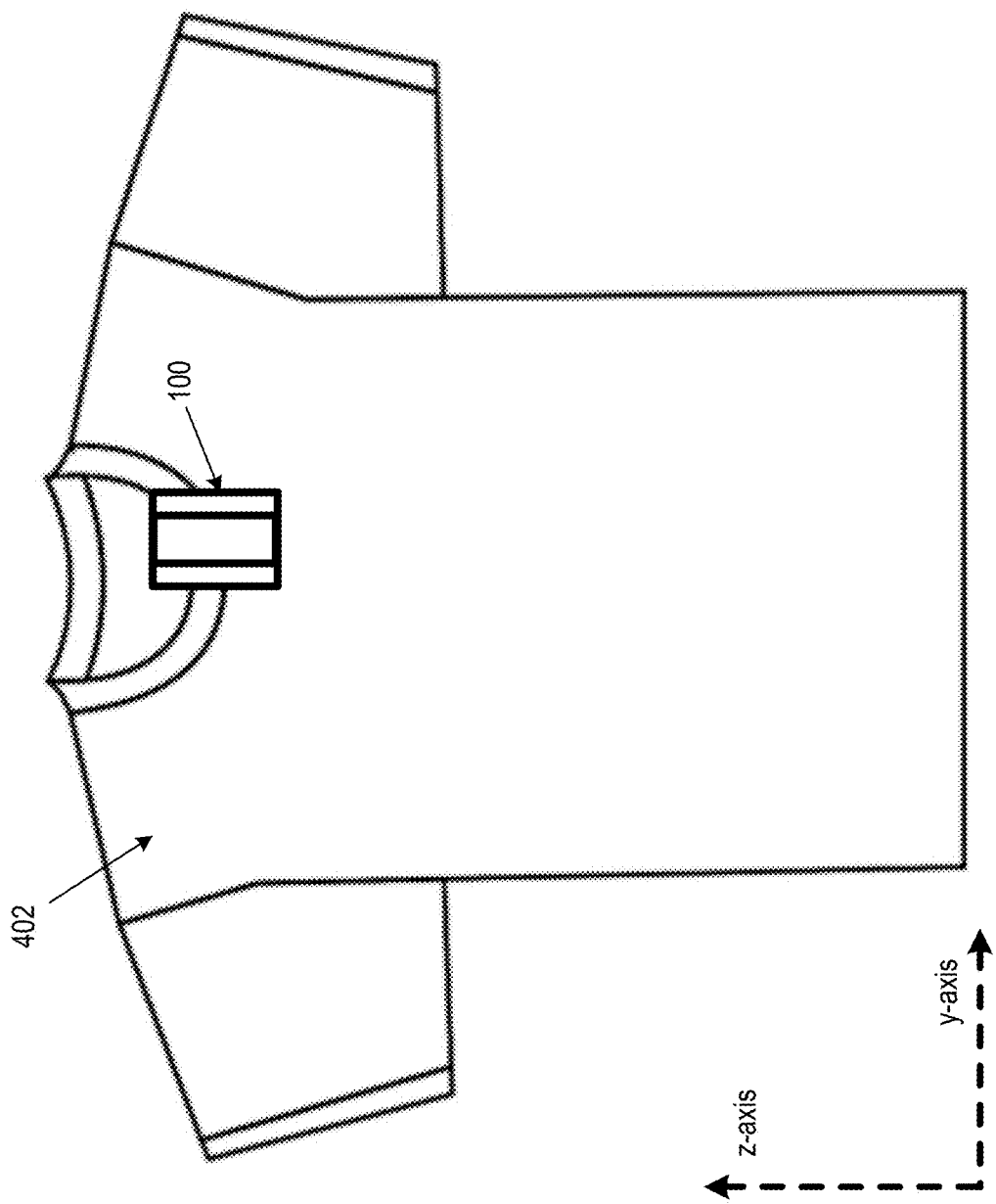
FIGS. 4A-4K are two-dimensional graphical illustrations of example embodiments of the present invention while secured to a garment.
Figure 4B:
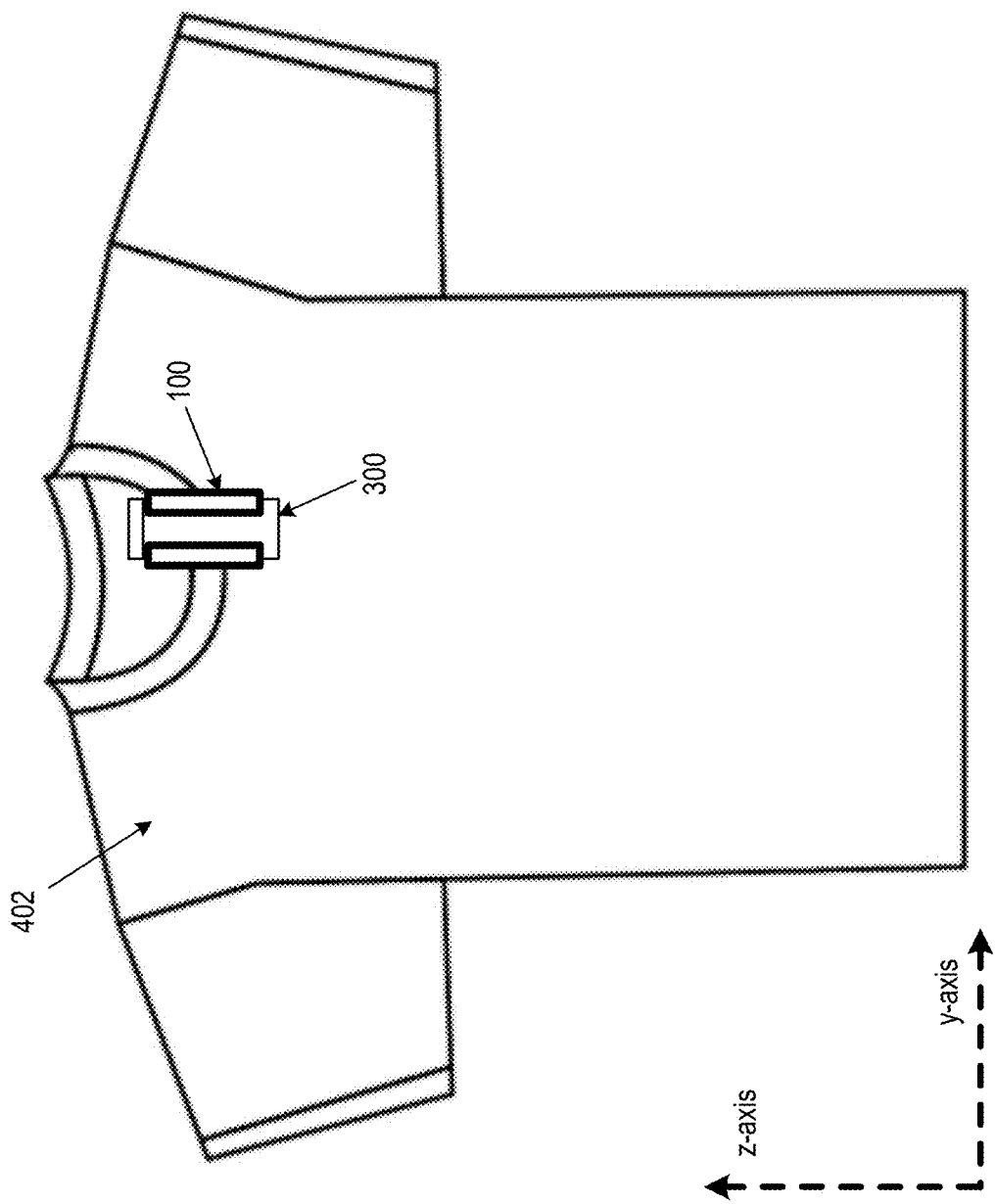
Figure 4C:
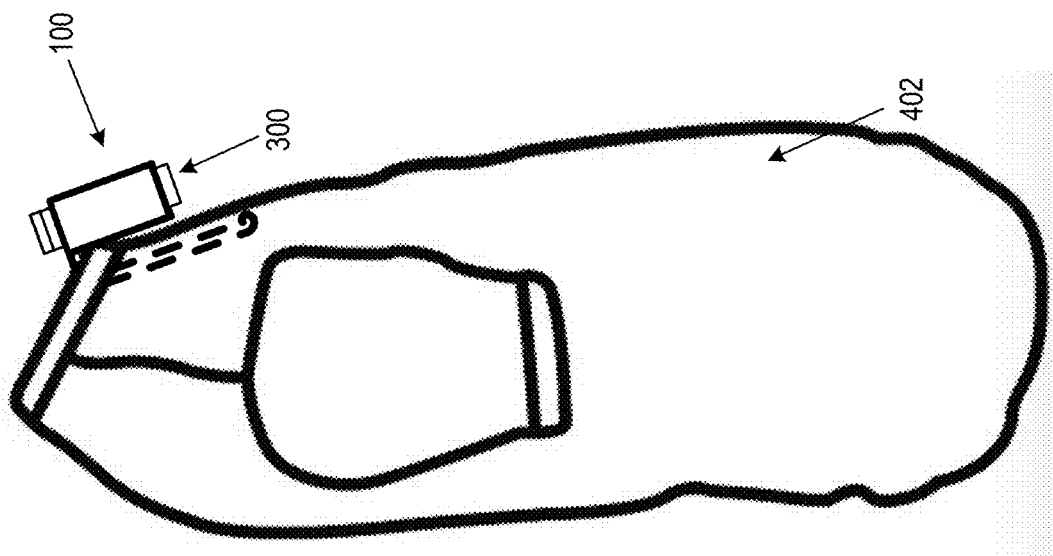
Figure 4C:
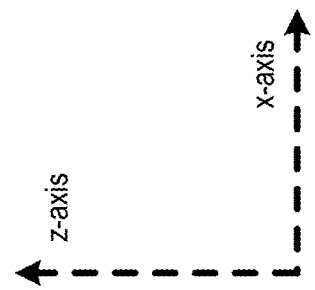

FIG. 4A illustrates a clipping cosmetic tube holder 100 that is clipped to a shirt 402, and FIG. 4B depicts the clipping cosmetic tube holder 100 clipped to the shirt 402 while holding cosmetic tube 300. FIG. 4C illustrates a side view of the clipping cosmetic tube holder 100 clipped to the shirt 402. The clipping element 110 is depicted with dotted lines to illustrate that the clipping element would not be visible, as it would lie underneath the fabric of the garment while clipped to the garment.

While FIGS. 4A-4C depict the garment secured by the clipping cosmetic tube holder 100 as a shirt 402, where the clipping cosmetic tube holder 100 is clipped to the collar of the shirt, the clipping cosmetic tube holder 100 can be clipped to other locations of the shirt 402, to multiple locations of multiple types garments, and/or to other fabrics and/or materials that are not worn by the user, but are otherwise associated with a user of the clipping cosmetic tube holder 100. In various embodiments, the clipping cosmetic tube holder can be configured to clip to a garment via a collar of the garment as shown in FIGS. 4A-4C, via a pocket of the garment, via a strap or belt-loop of the garment, via strings or laces of the garment, via button holes, mesh holes, or other holes in the garment, via any outer edge of the garment, or via any means of securing a portion of material of the garment via the clipping element. The clipping cosmetic tube holder can be configured to clip to one or more different types of garments, such as shorts, underwear, socks, shoes, jacket, pants, tank-top, bra, belt, necklace, hat, visor cap, and/or other wearable garment. The clipping cosmetic tube holder can be configured to clip to hair accessories such as a hair tie, headband, or hair clip, and/or can be configured to hold hair and act as a hair clip. The clipping cosmetic tube holder can be configured to clip to a purse, backpack, or other bag. The clipping cosmetic tube holder can be configured to clip to a bike basket, bike brake lines, car overheard visor, and/or other vehicle accessory for easy access in transit. The clipping cosmetic tube holder can be configured to clip to the strap and/or chain of a dog leash, dog collar, and/or other pet accessory. As used herein, "garment" can refer to any fabrics or other materials corresponding to any article of clothing or accessory discussed herein.

Figure 4E:
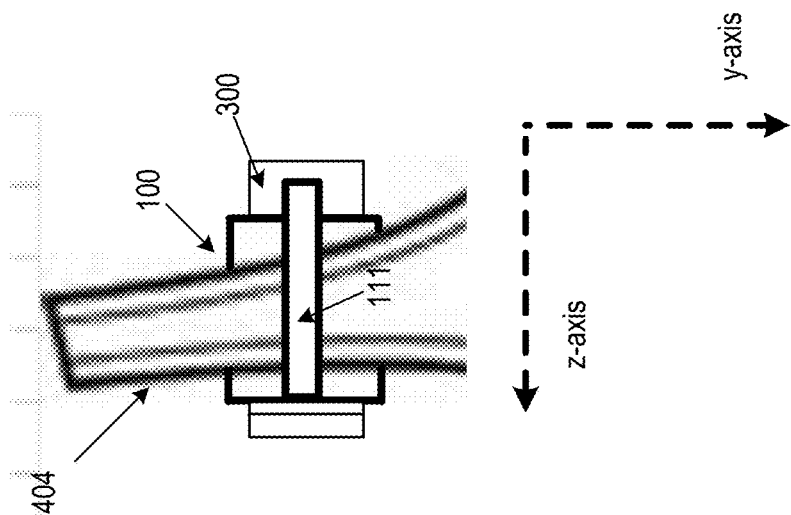
Figure 4D:
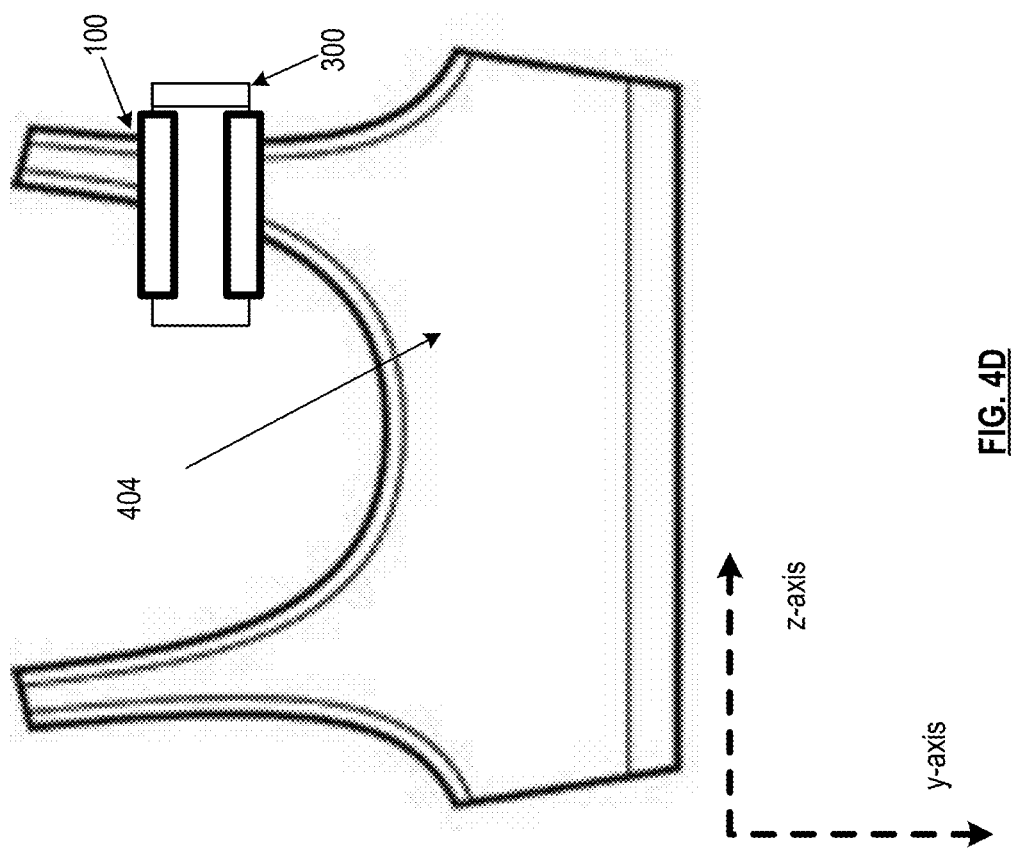
Figure 4F:
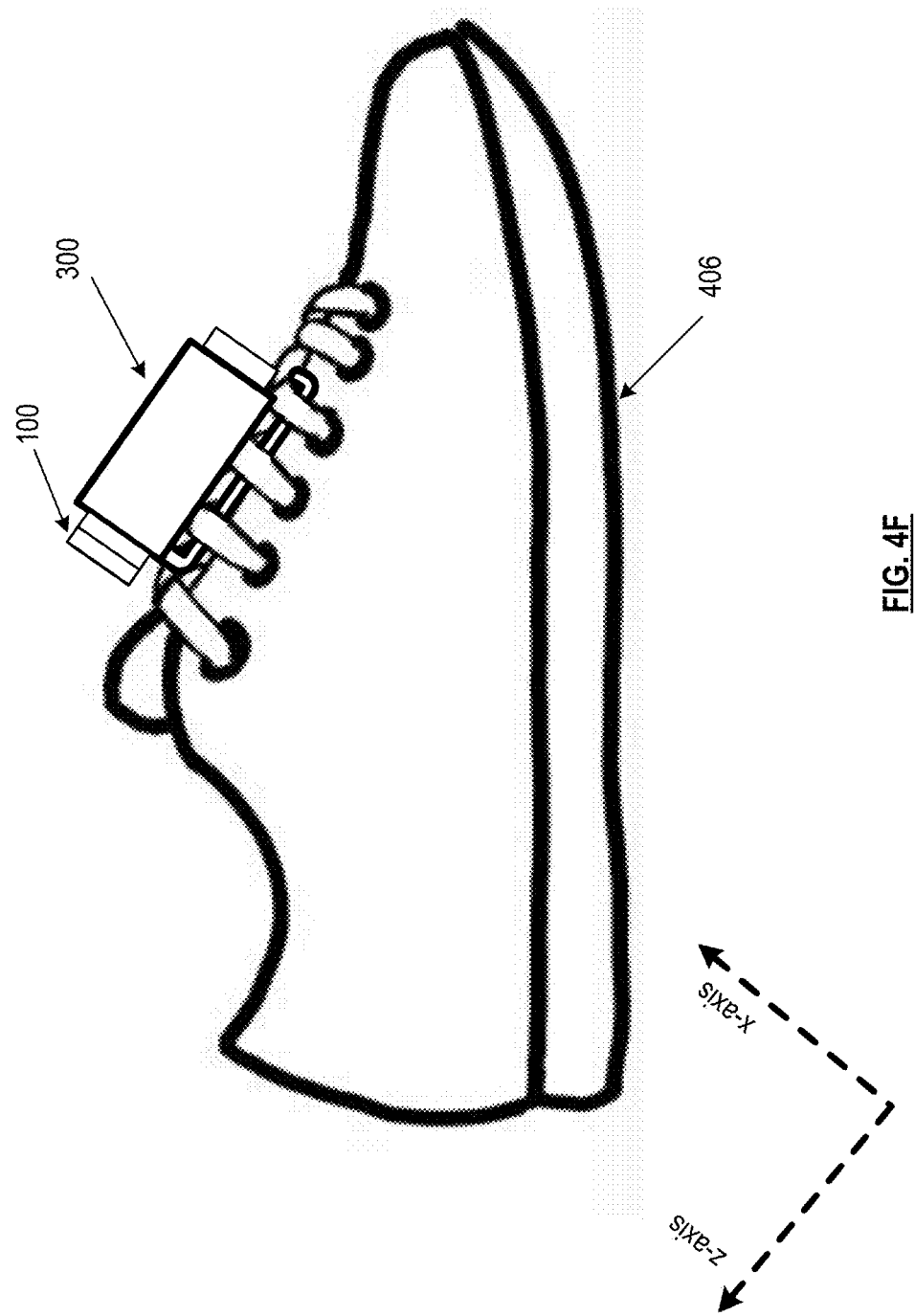
Figure 4I:
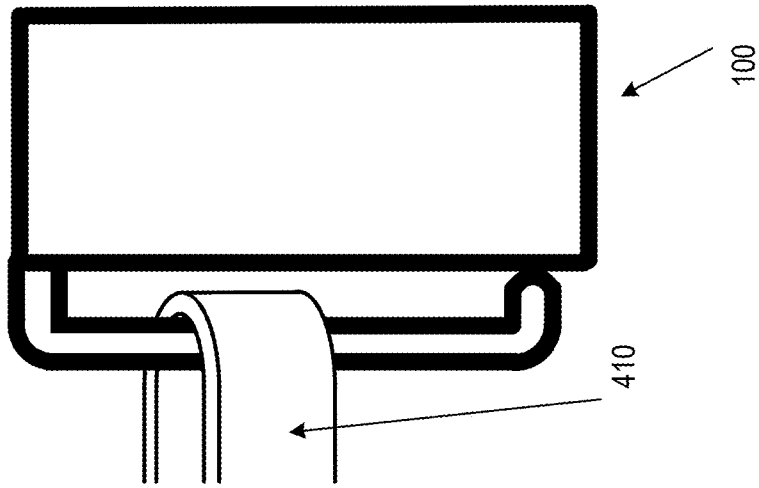
Figure 4H:
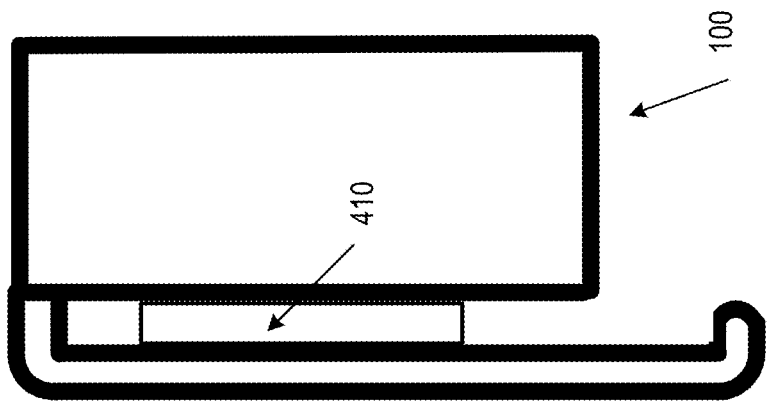
Figure 4G:
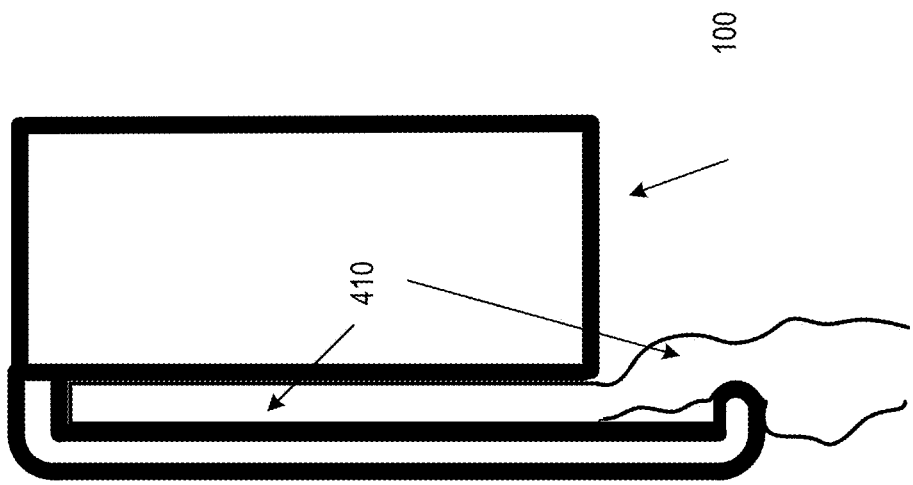

FIGS. 4D and 4E present an embodiment where the garment is a sports bra 404 to illustrate how clipping cosmetic tube holder 100 can be secured to garment straps, for example, by means discussed in conjunction with FIGS. 4G and/or 4H. Clipping cosmetic tube holder 100 can be secured to a tank-top strap, bag or purse strap, or other strap in a similar fashion. FIG. 4F presents an embodiment where the garment is a shoe 406 to illustrate how clipping cosmetic tube holder 100 can be secure to garment laces or other strings, for example, by means discussed in conjunction with FIGS. 4H and/or 4I.

The garment can be secured to the clipping cosmetic tube holder by gravitational forces. For example, when a gravitational force is acting opposite the direction of the z-axis, the garment can be secured at least in part by the bridge 126 as the weight of the cosmetic tube and/or the clipping cosmetic tube holder 100 itself pulls the bridge down against the garment. Such gravitational forces can be utilized in embodiments such as that illustrated in FIG. 4A: when a user is wearing the shirt 402 and standing upright, the weight of bridge 126 induced by gravitational forces can aid in securing the clipping cosmetic tube holder to shirt 402.

However, as discussed previously, additional forces of acceleration and deceleration may be induced on the clipping cosmetic tube holder 100 in some and/or all directions as a result of a user's physical activity, and gravitational forces alone might not keep the garment secure. Furthermore, in some embodiments, the gravitational force may be acting in a direction that is not opposite the z-axis, and thus the bridge may not be pushing down on the garment to secure the garment. For example, if the clipping cosmetic tube holder is secured to straps of a sports bra 404 as depicted in FIGS. 4D and 4E and the user wearing the sports bra 404 while standing in an upright position, the gravitational force will be induced along the y-axis. Thus, alternatively or in addition, the garment can be secured at least in part by a frictional force induced by the force of the garment against one or more portions of the clipping cosmetic tube holder that the garment is in contact with, such as the clip spine 111 of the clipping element, the clip toe 116, and/or the back portion 122 of the clip connector element.

FIGS. 4G-4K illustrate various means that a clipping cosmetic tube holder can secure a garment section 410 in various embodiments by utilizing gravitational and/or frictional forces. Garment section 410 can correspond to a collar or other edge of the garment, a strap or string of the garment, and/or other portion of the garment. Garment section 410 can be made up of material such as cotton, polyester, silk, wool, fleece, nylon, denim, leather, canvas, plastic, and/or other woven, non-woven, and/or knitted fabrics or other materials of a garment that is secured to clipping cosmetic tube holder 100 as discussed herein.

As shown in FIG. 4G, in some embodiments, the clipping cosmetic holder can secure the garment via along the entire length of the clip spine 111. In such embodiments, the clip toe can push against the garment to further secure the garment. For example, the garment section 410 of FIG. 4G can include a collar, and such means can be used to secure the shirt 402 of FIGS. 4A-4C. While the sports bra 404 of FIGS. 4D-4E is depicted with straps with a width that is less than the length of the clip spine, clipping cosmetic tube holder could clip to a similar sports bra or tank top with wider straps in a similar fashion as depicted in FIGS. 4D-4E, when the strap width exceeds the length of the clip spine, by utilizing such means as shown in FIG. 4G.

In FIGS. 4H and 4I the garment section 410 can include a belt, strap, string, loop such as a belt-loop, or other material that is secured entirely between the bridge and the clip toe. FIG. 4H demonstrates how garment section 410 can be tightly secured between the clip spine and the back portion of the clip connector element, where frictional forces induced by the clip spine 111 and the back portion 122 of the clip connector element secure the garment. For example, garment section 410 of FIG. 4H can include the strap of sports bra 404 of FIGS. 4D-4E or one or more shoe laces of the shoe 406 of FIG. 4F, and such means can be used to secure the clipping cosmetic tube holder 100 to sports bra 404 and/or the shoe 406. In contrast, FIG. 4I demonstrates how garment section 410 can be wrapped or looped around the clip spine. Rather than being tightly secured against the back portion 122, the garment section 410 can sit loosely between the clip spine and back portion and/or can wrap tightly around the clip spine, relying on frictional forces induced by the clip spine 111 alone to remain secured. For example, garment section 410 of FIG. 4I can include one or more shoe laces of the shoe 406 of FIG. 4F, and such means can be used to secure the clipping cosmetic tube holder 100 to shoe 406.

Figure 4K:
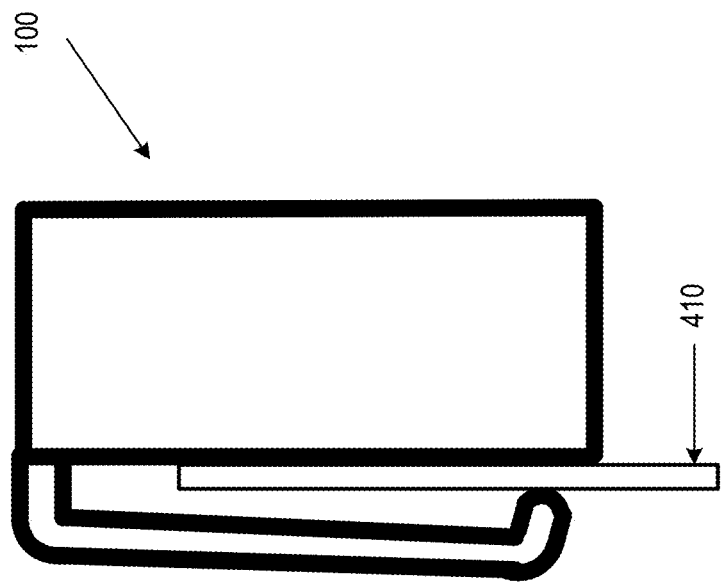
Figure 4J:
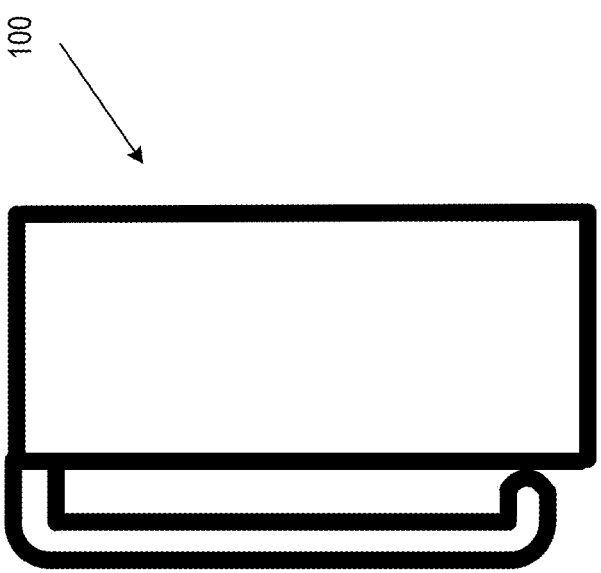

In some embodiments, a higher strength of the opposing forces against the garment can also be utilized to increase the frictional force securing the garment. The clipping element 110 of clipping cosmetic tube holder 100 can be configured to have a set neutral position when no cosmetic tube is inserted, with either a small initial gap 430 or no initial gap 430 as depicted in FIG. 4J. The clipping element 110 can move to a second position as depicted in FIG. 4K, where gap 430 is widened, for example, as a result of the elastic deformation of the clipping element 110 induced by the insertion of the garment, for example, where an angle between clipping element 110 and the bridge 126 increases. This widening of gap 430 can correspond to the width of slot 230. The frictional force securing the garment can be a function of the elastic deformation, inducing an opposing force as the clipping element push back against the garment towards its neutral position, and the Young's modulus of the material of the clipping element. In some embodiments, the elastic deformation of the clipping element can be used in conjunction with FIGS. 4G and/or 4H.

In other embodiments, to ensure frictional forces are strong enough to secure cosmetic tube 300 in place, some or all of the surface of the clip spine 111 of the clipping element, the clip toe 116, and/or the back portion 122 of the clip connector element that makes contact with the garment can be coated and/or lined with a different material, such as a rubber or adhesive material, that provides a higher coefficient of friction than the rest of the material of the clipping cosmetic tube holder 100. In various embodiments, such a coating and/or lining can be attached separately. For example, the coating and/or lining can be attached to surfaces of the clipping cosmetic tube holder 100 via an adhesive backing, and a user can elect to attach the coating and/or lining, for example, based on the texture of the garment. In various embodiments, the coating and/or lining is removable and can be applied repeatedly. In other embodiments, some or all of the surface of the clip spine 111 of the clipping element, the clip toe 116, and/or the back portion 122 of the clip connector element that makes contact with the garment can be textured, for example, with a rough texture and/or with tiny bumps, to provide a high enough coefficient of friction to secure the garment.

Figure 5C:
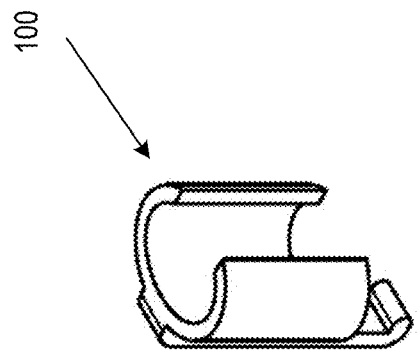
FIGS. 5A-5C illustrate an example embodiment of the present invention.
Figure 5A:
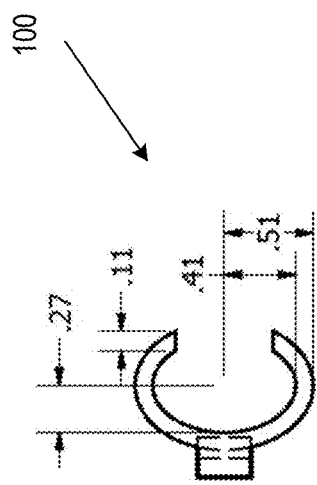
Figure 5B:
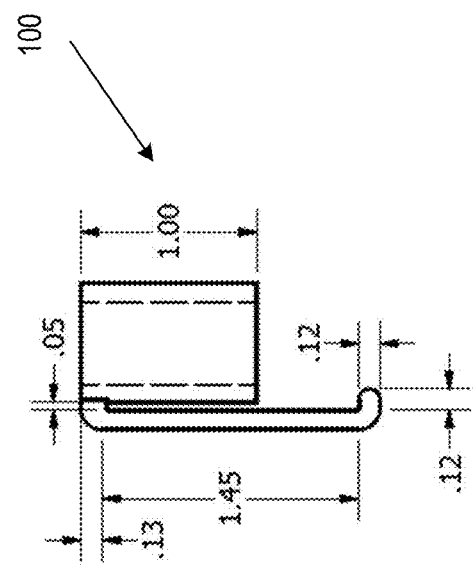

FIGS. 5A-5C illustrate an example embodiment of clipping cosmetic tube holder 100, where FIGS. 5A and 5B correspond to two-dimensional views of the clipping cosmetic tube holder 100 and FIG. 5C is a three-dimensional view of the clipping cosmetic tube holder 100 constructed from the two dimensional views in FIGS. 5A and 5B. The dimensions depicted can correspond to any unit, such as inches or centimeters, or correspond to proportionality constants with respect to the dimension of different sections of the clipping cosmetic tube holder 100. In other embodiments, the clipping cosmetic tube holder 100 can have different dimensions.

Figure 6A:
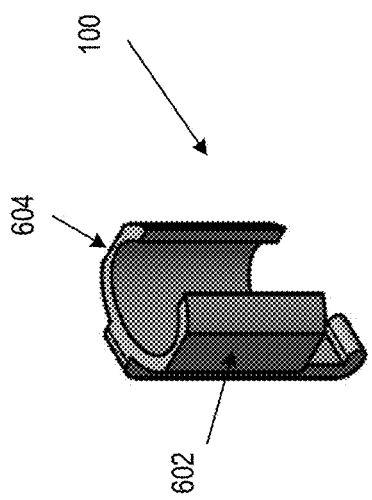
FIGS. 6A-6D illustrate an example embodiment of the present invention.
Figure 6C:
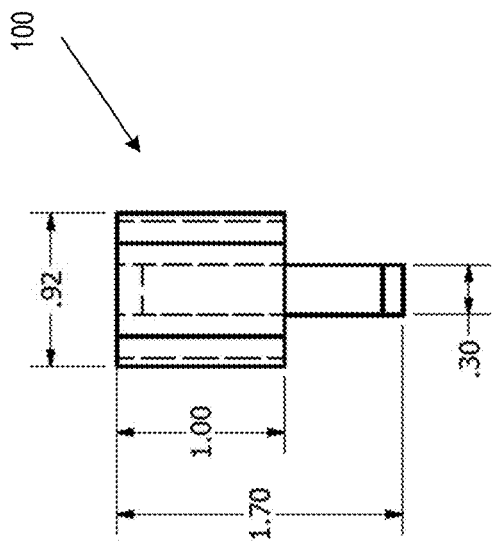
Figure 6B:
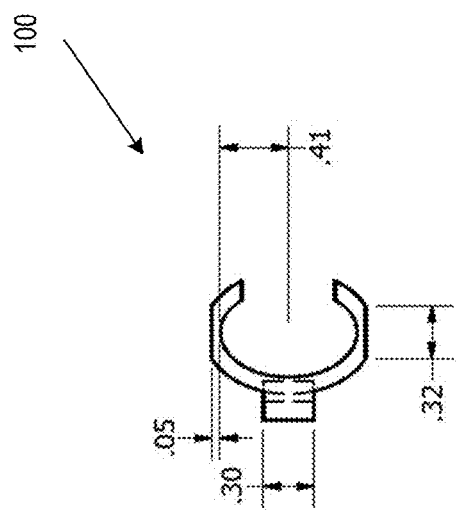
Figure 6D:
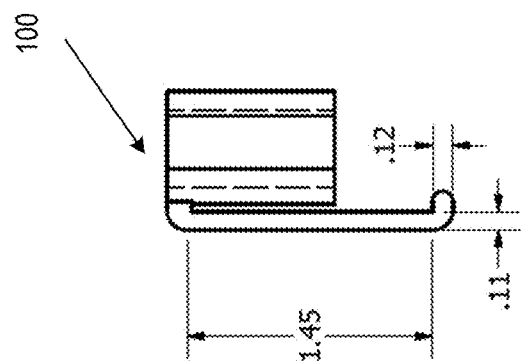

FIGS. 6A-6D illustrate an example embodiment of clipping cosmetic tube holder 100, where FIGS. 6A-6C correspond to two-dimensional views of the clipping cosmetic tube holder 100 and FIG. 6D is a three-dimensional view of the clipping cosmetic tube holder 100 constructed from the two dimensional views in FIGS. 6A-6C. The dimensions depicted can correspond to any unit, such as inches or centimeters, or correspond to proportionality constants with respect to the dimension of different sections of the clipping cosmetic tube holder 100. In other embodiments, the clipping cosmetic tube holder 100 can have different dimensions.

As depicted in FIGS. 6A-6D, the outer surface of the arced ribs of the clipping cosmetic tube holder 100 can include rectangular surfaces 602 and 604 that can lie flush to a flat surface. In various embodiments words and/or images, such as a logo, can be printed, etched, or otherwise can be visually depicted on rectangular surfaces 602 and/or 604, and/or rectangular surfaces 602 and/or 604 can be configured such that an adhesive sticker that includes a logo can be applied and secured to the surface. In various embodiments, the logo can correspond to a company, corporation, and/or other entity that manufactures or is otherwise associated with cosmetic tube 300 that the clipping cosmetic tube holder 100 is configured to hold. In various embodiments, the logo can correspond to a company, corporation, and/or other entity that manufactures or is otherwise associated with the clipping cosmetic tube holder 100 itself. In various embodiments, the logo can correspond to a company, corporation, and/or other entity that manufactures or otherwise is associated with the garment that the clipping cosmetic tube holder 100 is configured to secure, such as a brand of athletic apparel and/or a clothing line. In various embodiments, the logo can correspond to a company, corporation, sponsor, and/or other entity associated with an athletic group, such as a sports team logo associated with a sports team, for example, where users of the clipping cosmetic tube holder 100 are members of the sports team, attendees of an athletic event where the sports team is playing, and/or fans of the sports team. In various embodiments, the logo can correspond to a company, corporation, sponsor, and/or other entity associated with a race, tournament, competition, and/or other athletic event, for example, where users of the clipping cosmetic tube holder 100 are competitors or other participants in the race, tournament, competition, and/or other athletic event. In various embodiments, the logo can be configured by a user of clipping cosmetic tube holder 100, and can correspond to a company, corporation, and/or other entity associated with the user, such as a company owned by the user or a company where the user is employed. In various embodiments, the user can configure other words and/or images that are printed or otherwise applied to rectangular surfaces 602 and/or 604, such as the user's name, the user's initials, contact information associated with the user, or other information and/or images provided by the user. In various embodiments, a logo can be applied to any portion of the cosmetic tube holder of any other embodiments as described herein, for example, on the outer cylindrical surface of the arced ribs. Alternatively or in addition, a logo can be applied to the clip spine, for example, in embodiments where the clipping cosmetic tube holder is configured to secure to a strap of a purse, bag, or other garment or accessory that results in exposing the clip spine.

As shown in the figures and as described herein, the x-axis, y-axis, and z-axis represent three mutually orthogonal directions relative to the orientation of the present invention, where the z-axis is parallel to the longitudinal axis of the back portion 103 as described herein. While the x-axis, y-axis, and z-axis are depicted as three axis intersecting at a fixed point, the x-axis, y-axis, and z-axis as described herein correspond to direction, and not axes in fixed positions in space. As x-axis, y-axis, and z-axis are fixed with respect to the orientation of the present invention, the x-axis, y-axis, and z-axis can correspond to any set of three mutually orthogonal directions in three dimensional space in any orientation, as the present invention is capable of any orientation in three-dimensional space. As used herein, axes such as the longitudinal axes 102 and 103, the bridge axis 104, and/or the toe axis 106, while depicted as unidirectional axes, can be considered unidirectional, bidirectional, or any axes in three dimensional space, as described with respect to the x-axis, y-axis, and z-axis. As described herein, axes that are parallel to another axis, the x-axis, y-axis, and/or z-axis can include axes that are antiparallel or otherwise have an opposite direction of the x-axis, y-axis, and/or z-axis.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A clipping cosmetic tube holder, comprising:
a clip element having a clip spine that includes a first end and a second end, wherein the clip element further includes a clip toe that protrudes from the second end in a direction normal to a longitudinal axis of the clip spine;
a clip connector element that includes a back portion, a pair of arced ribs, and a bridge that connects the back portion to the clip element at the first end of the clip spine, wherein a longitudinal axis of the back portion is offset from and parallel to the longitudinal axis of the clip spine forming a slot between the clip spine and the back portion, wherein the slot is configured to secure a portion of a garment within the slot and along the clip spine between the bridge and the clip toe while the garment is being worn by a user of the clipping cosmetic tube holder, wherein the pair of arced ribs are connected to the back portion and are bilaterally symmetrical about the longitudinal axis of the back portion, wherein the pair of arced ribs are configured to secure a first cosmetic tube to the back portion by wrapping around a longitudinal section of a cylindrical surface of the first cosmetic tube, wherein the pair of arced ribs each have an arc length less than half of a first circumference of the first cosmetic tube, wherein a frictional force induced by the clipping element against the garment, and wherein the clipping cosmetic tube holder is configured to secure to the garment in an orientation with a gravitational force being induced in a direction that is normal to the longitudinal axis of the back portion and the longitudinal axis of the clip spine by utilizing the frictional force, wherein an inner surface of the pair of arced ribs has a first coefficient of friction, and wherein an outer surface of the pair of arced ribs has a second coefficient of friction that is less than the first coefficient of friction, and wherein the back portion of the clip connector element has a third coefficient of friction that is greater than the first coefficient of friction and the second coefficient of friction; and
a detachable lining that includes an adhesive backing, wherein the detachable lining is attached to the back portion of the clip connector element via the adhesive backing in a first configuration, wherein the detachable lining is separated from the clipping cosmetic tube holder in a second configuration, wherein the back portion of the clip connector element has the third coefficient of friction when the detachable lining is in the first configuration, wherein the back portion of the clip connector element has a fourth coefficient of friction when the detachable lining is in the second configuration, and wherein the fourth coefficient of friction is less than the third coefficient of friction.

2. The clipping cosmetic tube holder of claim 1, wherein a length of the back portion is less than a length of the first cosmetic tube.

3. The clipping cosmetic tube holder of claim 2, wherein the pair of arced ribs connect to the back portion along an entire length of the back portion.

4. The clipping cosmetic tube holder of claim 2, wherein a length of the clip spine between the bridge and the clip toe is greater than the length of the back portion.

5. The clipping cosmetic tube holder of claim 1, wherein the bridge connects from the first end of the clip spine to a first end of the back portion in the direction, parallel to the clip toe.

6. The clipping cosmetic tube holder of claim 1, wherein the clipping cosmetic tube holder is further configured to hold a second cosmetic tube having a same transverse cross section as the first cosmetic tube, and wherein a first tube length of the first cosmetic tube is not equal to a second tube length of the second cosmetic tube.

7. The clipping cosmetic tube holder of claim 1, wherein the clip element and the clip connector element are molded as a single piece of plastic material.

8. The clipping cosmetic tube holder of claim 7, wherein the plastic material includes at least one of: polyethylene or polyurethane.

9. The clipping cosmetic tube holder of claim 1, wherein the arc length of each of the pair of arced ribs is greater than one quarter of the first circumference of the first cosmetic tube.

10. The clipping cosmetic tube holder of claim 1, wherein the pair of arced ribs are extendable to secure a second cosmetic tube having a second circumference that is greater than the first circumference.

11. The clipping cosmetic tube holder of claim 1, wherein a width of the slot between the clip spine and the back portion is configured to accommodate a thickness of the garment.

12. The clipping cosmetic tube holder of claim 1, wherein the portion of the garment is a at least one shoelace of a shoe being worn by the user of the clipping cosmetic tube holder.

13. The clipping cosmetic tube holder of claim 1, wherein the garment includes a shirt being worn by the user of the clipping cosmetic tube holder, and wherein the portion of the garment is a collar of the shirt.

14. The clipping cosmetic tube holder of claim 1, wherein the portion of the garment includes a strap being worn by the user of the clipping cosmetic tube holder, and wherein a width of the slot between the clip spine and the back portion is configured to accommodate a thickness of the strap, and wherein the strap is one of: a tank top strap or a bra strap.

15. The clipping cosmetic tube holder of claim 14, wherein a length of the clip spine between the bridge and the clip toe is configured to accommodate a width of the strap.

16. The clipping cosmetic tube holder of claim 1, wherein clipping element is configured to undergo an elastic deformation induced by an insertion of the garment into the slot, and wherein the frictional force induced by the clipping element against the garment is a function of the elastic deformation.

17. The clipping cosmetic tube holder of claim 1, wherein an outer surface of the pair of arced ribs of the clipping cosmetic tube holder includes at least one rectangular surface that can lie flush to a flat surface, and wherein an image corresponding to a logo is printed on the at least one rectangular surface.

* * * * *